United States Patent
Bruns et al.

(10) Patent No.: US 9,936,632 B2
(45) Date of Patent: Apr. 10, 2018

(54) AGRICULTURAL DRY CHEMICAL TUBE AND DELIVERY SYSTEM

(71) Applicant: Deere & Company, Moline, IL (US)

(72) Inventors: Daniel P. Bruns, Ankeny, IA (US); Ken Herrmann, Port Byron, IL (US)

(73) Assignee: DEERE & COMPANY, Moline, IL (US)

( * ) Notice: Subject to any disclaimer, the term of this patent is extended or adjusted under 35 U.S.C. 154(b) by 132 days.

(21) Appl. No.: 14/617,124

(22) Filed: Feb. 9, 2015

(65) Prior Publication Data

US 2016/0066500 A1   Mar. 10, 2016

Related U.S. Application Data

(60) Provisional application No. 62/045,861, filed on Sep. 4, 2014.

(51) Int. Cl.
*A01C 7/20* (2006.01)
*A01C 5/06* (2006.01)
*A01C 23/02* (2006.01)

(52) U.S. Cl.
CPC ............. *A01C 7/206* (2013.01); *A01C 5/064* (2013.01); *A01C 7/20* (2013.01); *A01C 23/025* (2013.01); *A01C 5/066* (2013.01)

(58) Field of Classification Search
USPC ........................................................ 111/170
See application file for complete search history.

(56) References Cited

U.S. PATENT DOCUMENTS

| 1,699,688 | A | * | 1/1929 | Cross | B21K 23/04 |
| | | | | | 122/DIG. 13 |
| 3,854,429 | A | | 12/1974 | Blair | |
| 5,092,255 | A | * | 3/1992 | Long | A01C 5/064 |
| | | | | | 111/167 |
| 5,979,343 | A | * | 11/1999 | Gregor | A01C 7/081 |
| | | | | | 111/175 |
| 6,059,047 | A | | 5/2000 | Schimke | |
| 6,386,127 | B1 | * | 5/2002 | Prairie | A01B 71/02 |
| | | | | | 111/167 |
| 6,397,767 | B1 | | 6/2002 | Dietrich | |
| 6,688,243 | B1 | | 2/2004 | Buchholtz | |
| 6,871,709 | B2 | | 3/2005 | Knobloch et al. | |
| 7,168,376 | B2 | | 1/2007 | Johnston | |
| 7,487,732 | B2 | | 2/2009 | Johnston et al. | |
| 7,581,503 | B2 | | 9/2009 | Martin et al. | |
| 7,653,999 | B2 | | 2/2010 | Varo et al. | |

(Continued)

OTHER PUBLICATIONS

Operators Manual. Product brochure [online]. MonTag, vol. 3, 2014 [retrieved on Jan. 26, 2015]. Retrieved from the Internet: <URL: http://www.montagmfg.com/documents/MontagRev3June2014-Printcopy.pdf>.

(Continued)

*Primary Examiner* — Alicia Torres

(57) ABSTRACT

A dry chemical delivery tube and its surrounding nutrient applicator system are located in a narrow space in a soil working implement in an agricultural setting. Between an inlet end and an outlet end, the chemical delivery tube transitions from a circular cross section to an oval cross section. In one embodiment, the soil working implement includes soil opening/closing disks and liquid or gaseous delivery tubes that closely surround the chemical delivery tube.

35 Claims, 16 Drawing Sheets

(56) References Cited

U.S. PATENT DOCUMENTS

| | | | |
|---|---|---|---|
| 7,866,270 B2 | | 1/2011 | Ankenman |
| 8,186,287 B2 * | | 5/2012 | Schilling ................ A01C 5/064 111/167 |
| 2007/0245939 A1 * | | 10/2007 | Gehrer ................... A01C 5/062 111/170 |
| 2008/0006189 A1 * | | 1/2008 | Johnston ................ A01C 5/064 111/152 |
| 2012/0145057 A1 * | | 6/2012 | Hagny ................... A01C 7/206 111/163 |

OTHER PUBLICATIONS

5/8 Inch Bent Chromoly Swedged Tubes, Speedway Motors, published Apr. 29, 2012, [retrieved from the Internet: Oct. 31, 2015]. Retrieved from Internet: <http://www.speedwaymotors.com/5-8-Inch-Bent-Chromoly-Swedged-Tubes,49385.html>.

Photograph of Agriculture Synergy Booth at the Farm Progress Agriculture Exhibit, dated Sep. 2, 2014.

* cited by examiner

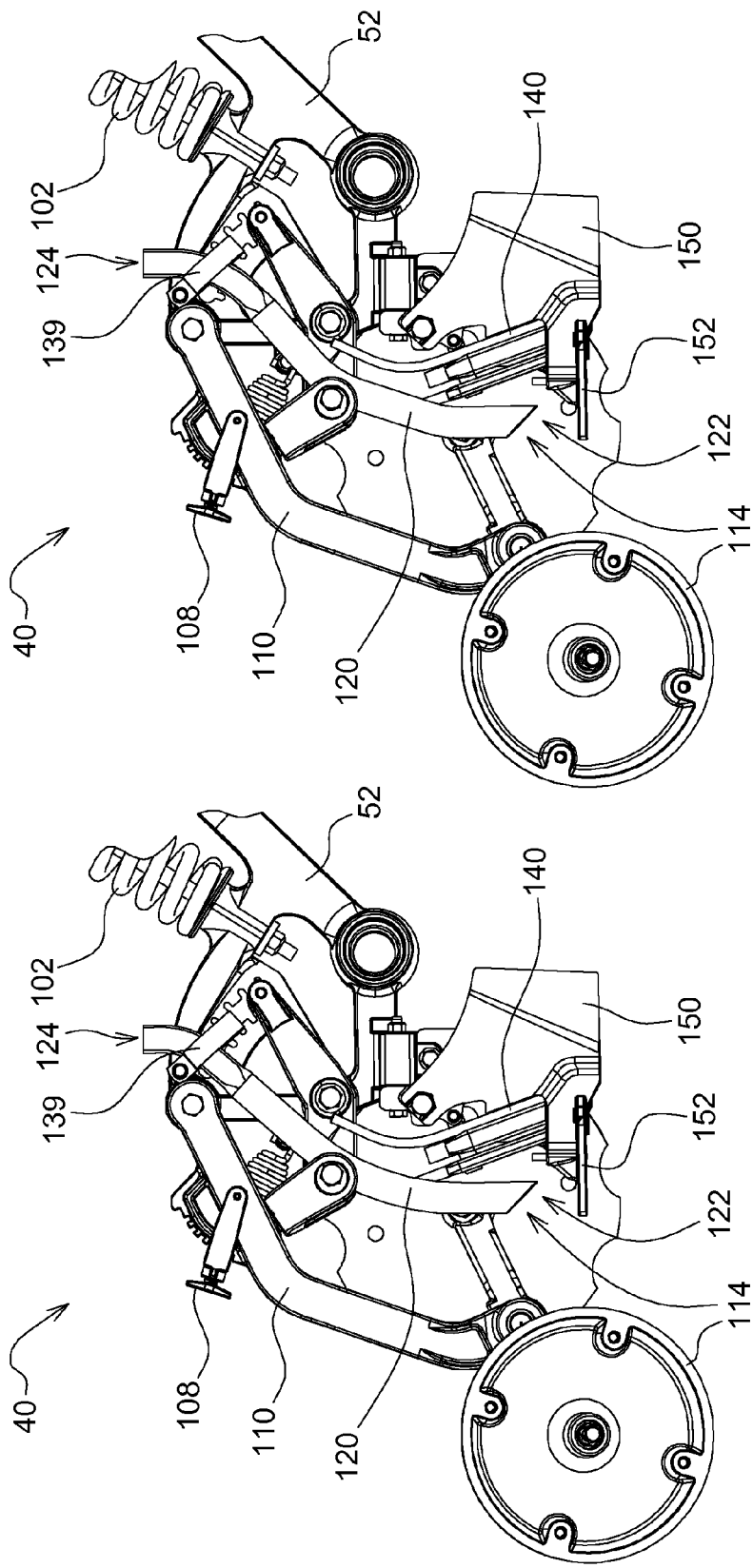

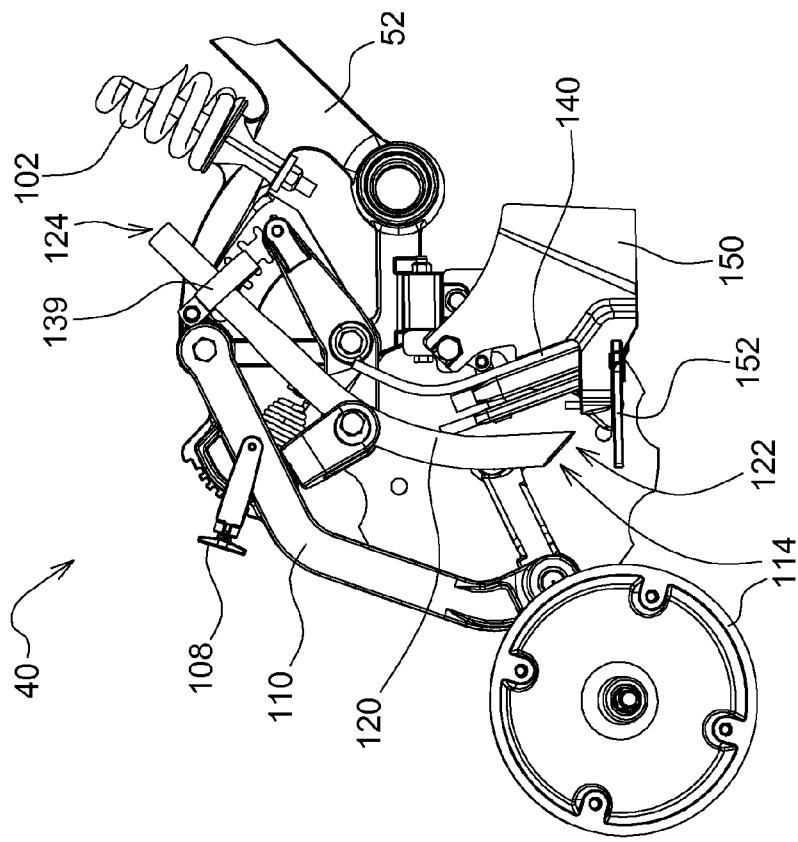
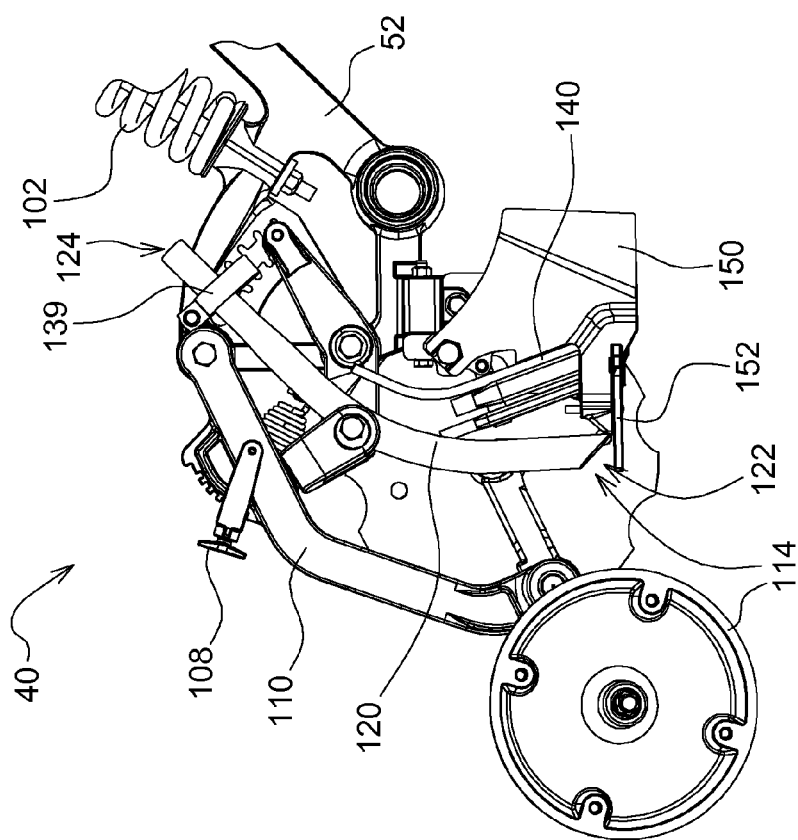

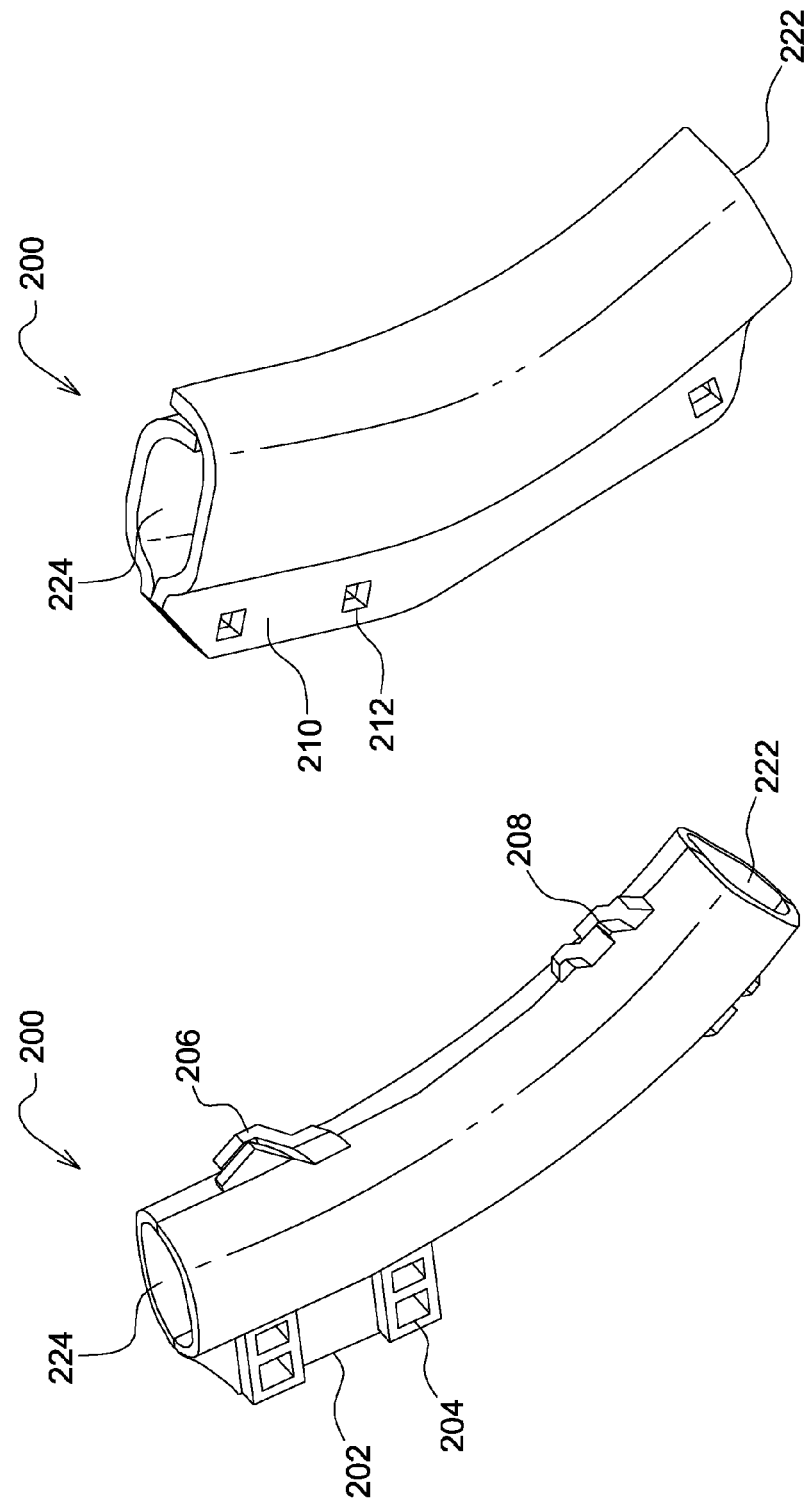

AGRICULTURAL DRY CHEMICAL TUBE AND DELIVERY SYSTEM

This patent application claims priority to U.S. Provisional Patent Application Ser. No. 62/045,861, filed Sep. 4, 2014, and titled, AGRICULTURAL DRY CHEMICAL TUBE SYSTEM, the contents of which are incorporated herein by reference.

FIELD OF THE DISCLOSURE

This disclosure relates generally to agricultural applicator machines having associated dispensers that deposit dry fertilizer and other chemicals in the soil.

BACKGROUND OF THE DISCLOSURE

Different types of fertilizers, herbicides and other chemical compounds are delivered to crops, plants and trees in a dry granular (solid), liquid and/or gaseous form. When it comes to dry chemicals, it is difficult position the delivery system in a compact space in order to quickly and cheaply deliver the chemicals at an optimal depth along with delivering other chemicals or plant seeds and along with performing other tasks (e.g. tilling the soil). Dry chemical delivery methods also generally cannot be mixed with liquid chemical delivery methods because chemicals having different phases of matter differ in particle size, transport and flow methods in a delivery chute. Additionally, different types of dry chemicals or different types of liquid chemicals may also need to be processed or released separately if the different chemicals interact undesirably when mixed together.

SUMMARY OF THE DISCLOSURE

Example embodiments include a vehicle having a chemical dispenser system that distributes dry fertilizers, nutrients, herbicides and other agricultural substances through a delivery tube to the soil or furrow in soil. In one version, the delivery tube includes a circular cross section in an upper section of the tube, which becomes an oval cross section in an adjacent section nearer to the soil. The tube is located following a soil boot or scraper. Alternatively, the tube is coupled to the frame of the chemical dispenser system, or the tube is attached to a mounting plate of a soil opening/closing system. Other features and embodiments are disclosed in the detailed description, accompanying drawings and claims.

BRIEF DESCRIPTION OF THE DRAWINGS

The details of one or more implementations are set forth in the accompanying example drawings, the description and claims below.

FIG. 12 depicts a side view of part of another example chemical delivery system.

FIG. 13 depicts a side view of part of another example chemical delivery system.

FIG. 20 depicts a side view of part of another example chemical delivery system.

FIG. 21 depicts a side view of part of another example chemical delivery system.

FIG. 22 depicts an upper portion of an example delivery tube made of a composite or polymer material.

FIG. 23 depicts a lower portion of an example delivery tube made of a composite or polymer material.

DETAILED DESCRIPTION

Figure 1:
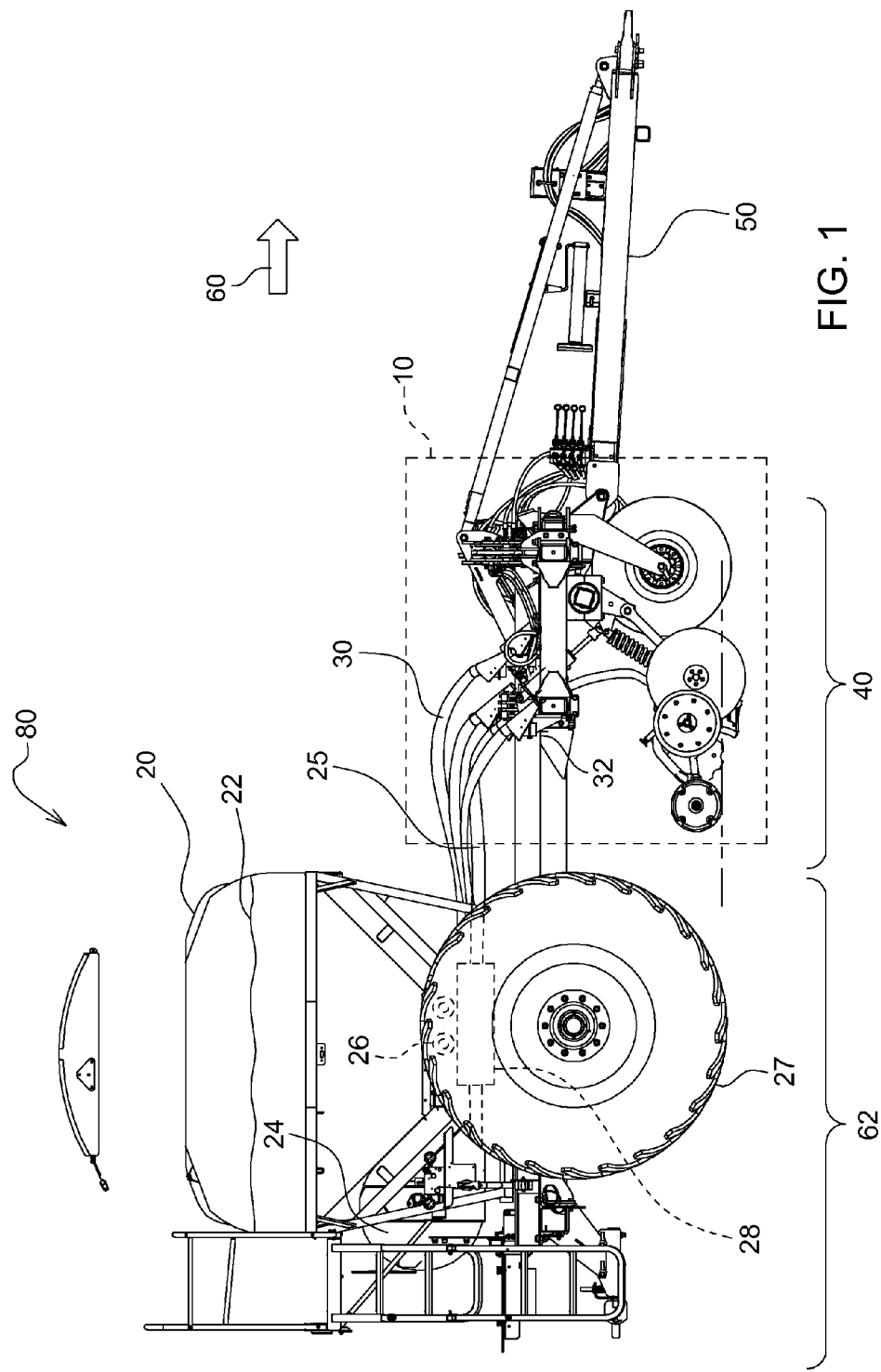
FIG. 1 depicts a side view of an example towed chemical hopper and chemical delivery system.

Embodiments of a dry chemical delivery system are described; the system includes a chemical delivery tube that fits and conforms to the narrow, tight space among disks, delivery hoses and other surrounding equipment on an agricultural implement. The shape and position of the dry chemical delivery tube also enhance delivery flow and crop-yield. In some examples, both the dry and liquid/gas chemical delivery (for nutrients, herbicide) tubes are located as closely as possible, which tends to enhance crop yields and at least avoids having to make two delivery passes over the field. The delivery tubes follow disks or cutting tools that first open the soil before the chemical delivery occurs. In some embodiments, the delivery is performed after a cleaning scraper action on the soil opening disk/blade so that residue and mud are less likely to build up and clog the tube outlets or prevent proper soil closure over the delivered chemicals. These features may be more important for dry chemicals because unlike liquids and gases, dry chemicals cannot seep through residue buildup. The dry chemical delivery system may be used in conjunction with seeding, tillage, forestry, or even in non-agricultural arrangements such as in construction where compounds are delivered and mixed together.

In some embodiments, an agricultural machine such as a seeder, tillage implement or chemical delivery system includes a frame, at least one soil opener disk mounted to a disk gang or to a frame of the agricultural machine, and chemical delivery tubes. The soil opener disk is adjacent to or followed by a boot blade or scraper relative to the travel direction, and at least one chemical delivery tube or cylinder is mounted on the soil opening frame or located just behind the boot relative to the travel direction. The largest chemical delivery tube such as for dispensing solid chemicals ("chemical tube") is mounted on the soil opening frame or is positioned following the boot or disk and in some cases also positioned following other tubes that deliver liquids, gases or solids. The boot blade may include a recess at a lower trailing edge of the blade. The recess at least partially surrounds other types of delivery liquid/gas tubes (e.g. liquid or gaseous anhydrous ammonia tube).

In some embodiments, the chemical delivery tube is circular in cross section in one section (e.g. upper portion) of the tube and becomes oval in cross section in an adjacent section of the tube (e.g. the end where the chemical is released). The circular cross section has uniform radius. The circular input aids gravitational flow of the chemicals, but at the point of delivery, placement is more precise if the tube is shaped as an oval or as a funnel with a pointed spout to guide the chemicals. The curved profile and shape of the tube allows for it to fit, and be positioned and mounted within the confines of the gauge wheel, closing wheels and mounting structures of the agricultural unit (e.g., cultivator, seeder, nutrient applicator) and provide an efficient pathway for the chemical to be placed in the furrow at a desired depth and location relative to the soil opener disk and boot/scraper. Other reasons for confining the various tubes in one area include simultaneous or quick-successive delivery of different chemicals and then quickly covering the deposited chemicals with soil so that little escapes.

FIG. 1 depicts a side view of an example of an applicator system 80 that is towed by a vehicle such as a tractor or a seed planter moving in a travel direction 60. Applicator system 80 includes an implement frame 50 with wheels, directly (e.g. welded or bolted) or indirectly (e.g. temporarily hitched) attached to a chemical delivery system 10 having chemical tubes (e.g. 120) and a soil opener/closing system 40 at the lower portion of system 10, and then also to a chemical hopper 20 system. When filled, the chemical hopper 20 contains chemicals 22 such as fertilizer and is mounted on top of a platform 25 having two cart wheels 27; the platform 25 can be hitched to the implement frame 50. Alternatively, as shown in FIG. 1, the platform 25 is integrated as one frame with the application implement frame 50; nuts/bolts/screws or welding connect the parallel bars 31 (parallel to travel direction 60) of the platform 25 to the two ranks or horizontal bars 54 (perpendicular to direction 60) of the frame 50. A large round cart wheel 27 is mounted to an outer end of the suspension and axle underneath the platform 25; the two cart wheels 27 provide smooth level support to the hopper 20. When filled with chemicals, large hoppers 20 become very heavy and compress the soil underneath the applicator system 80. But the large-diameter (e.g. >3 ft), wide round cart wheel 27 distributes the weight and reduces the compaction. Although not shown, track type wheels (e.g. tracks or tank wheels) are another option to distribute the weight and they can be designed to leave a smaller footprint than pneumatic cart wheels 27. Depending on the soil and terrain, either the tracks or the large round cart wheels 27 are dismountable and serve as "spares" similar to spare tires for automobiles.

Figure 1A:
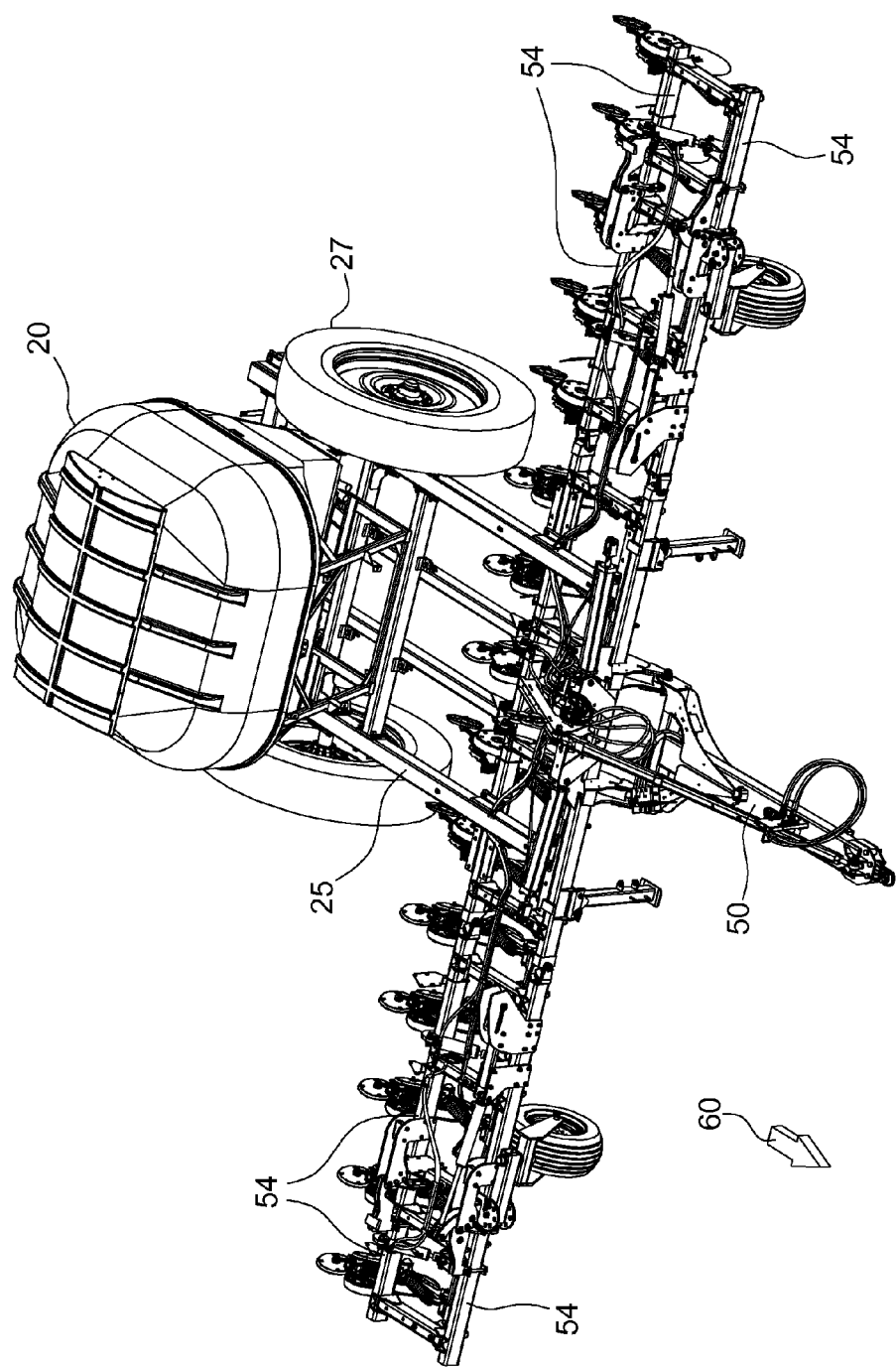
FIG. 1A depicts an example gang of the chemical delivery systems shown in FIG. 1.

In FIG. 1, the chemical delivery system 10 also includes distribution conduits 30 and hydraulics located above the ground-working equipment: a soil open/closer system 40 that includes tubes, dry chemical tubes 120 and wet chemical tubes ("wet fertilizer tube" 140, which may be a chemical other than fertilizer). The chemical tubes 120 and open/closer system 40 are attached to the lower end of the implement frame 50, which is sometimes part of a nutrient applicator machine in the agricultural industry. In the cross section portrayal of FIG. 1, only one chemical delivery system 10 and opener/closer 40 are shown, but usually there is a gang row of them as shown in FIG. 1A. FIG. 1A depicts a top view of FIG. 1, showing a gang of chemical delivery systems 10 that are mounted to two ranks or horizontal bars 54 so that the delivery systems 10, chemical tubes (e.g. 120) and a soil opener/closing system 40, and chemical tubes 120 are respectively parallel to one another. The ranks or horizontal bars 54 are an integral part of or are attached (e.g. welded or bolted) to the implement frame 50. In many examples, the full width of the applicator system 80 ranges from 35 ft to 60 ft, and the chemical delivery systems 10 are spaced approximately 2 ft to 3 ft apart, but these ranges and spacing are adjustable to suit the crop row spacing.

As an alternative to what is shown in FIG. 1 or 1A, there is also a tillage implement such as a cultivator between the vehicle and the applicator system 80 or chemical delivery system 10. The width of a tillage implement is often in the range of 65-75 feet, which also correlates with the width of the chemical delivery system 10 so that they may be compatibly used together. The addition of a tillage implement still allows the entire system 80 to travel in varying residue types and soil conditions, till, fertilize and move up to 5-15 mph.

Figure 2:
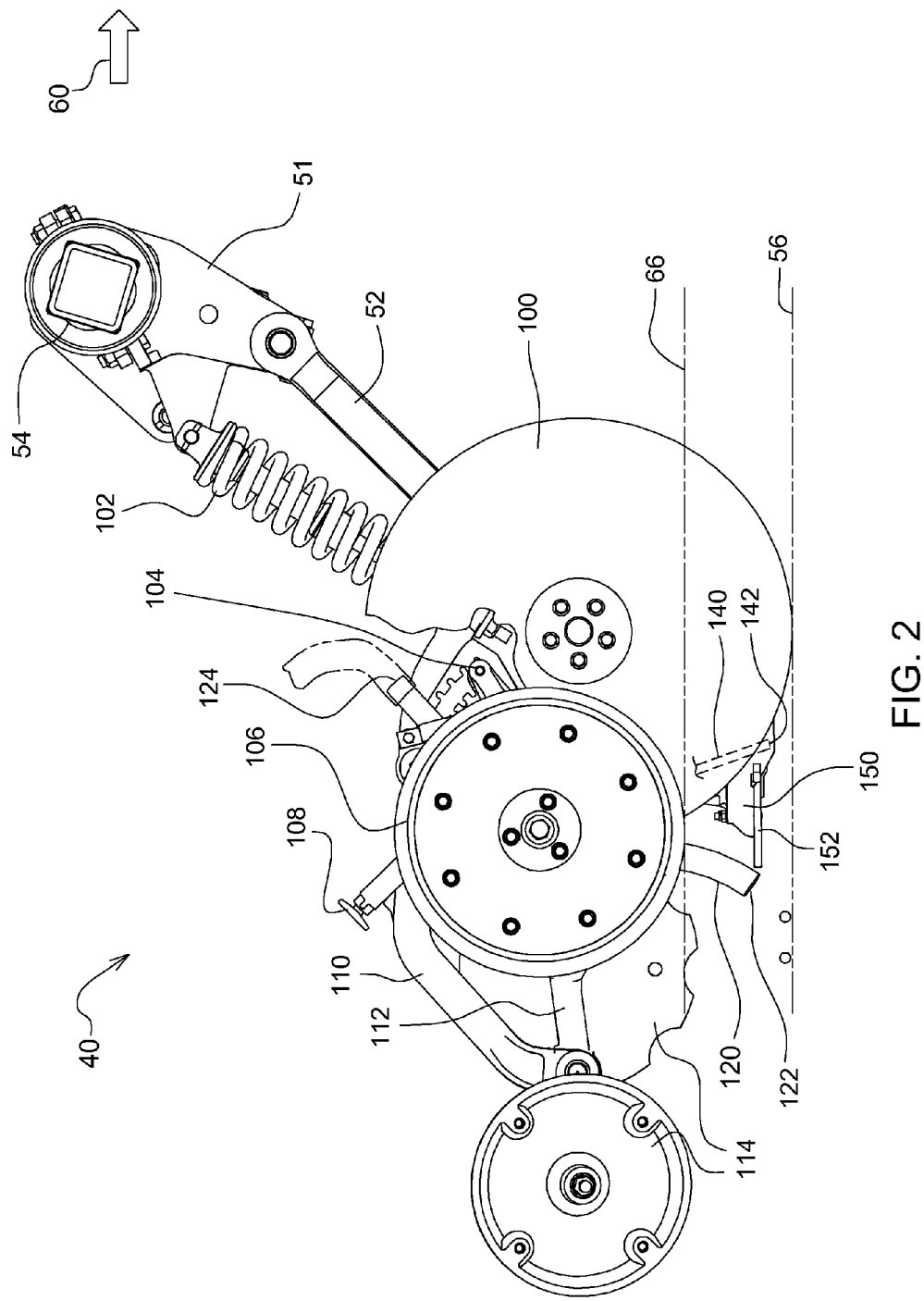
FIG. 2 depicts a side view of an example chemical delivery system having a soil opener, delivery tubes and soil closer.

FIG. 2 depicts a side view of an example soil opener/closer system 40 that is coupled to a soil opener disk 100, delivery tubes (120, 140), and two varieties of soil closing disks 114. The soil opener disk 100 opens a trench in the soil in which one or more selected phases of chemicals are deposited (e.g., dry, liquid and/or gaseous fertilizer). Control of the chemical application is performed partly through the use of implement height sensors and travel speed monitoring (speedometer of the vehicle). The height sensors are mounted to the implement frame 50 of the agricultural implement. The sensors communicate through protocols such as CAN-bus with a centralized computer or microcontroller that controls the height of the implement frame 50 towing the chemical application (e.g. chemical tubes 120) or the height of the components attached to the implement frame 50 or to the opener/closer system 40. Height adjustment raises and lowers system 40 so that the opener disk 100 cuts below the soil surface 66, down to a few or several inches to the opener disk depth 56. The optimal height depends on the types of chemicals that are deposited, the type of soil, type of crop, and so on. In other embodiments, height adjustment is achieved hydraulically or by mechanical changes (e.g. tension adjuster or lever setting) to the down pressure on the entire implement frame 50 or to individual depth adjusters 104 or to components such as the chemical tube 120. For example, an operator can manually adjust valves or ratchet the depth adjuster 104 to obtain the desired pressure and corresponding depth setting. Or, an operator can use an automated down pressure monitor with feedback that checks the height of the gauge wheel 106 and whether it makes contact with the soil surface 66 to adjust a depth on the fly. Under any of these ways, the opener disk 100 creates a furrow or trench at a depth that is based on the down pressure used to adjust the height of the frame members (e.g. 52, 110), the compression of the coil spring 102, and the depth adjuster 104 of the chemical applicator. The result is that the outlets of the chemical tubes 120 or fertilizer tubes 140 move closer or farther from the soil. Metering of the chemical application and determination of the rate of chemical release are conducted by a computer or a micro-controller in the vehicle or under the control of the operator. After dry chemicals (e.g. 22) or liquids (e.g. anhydrous ammonia) are released into the soil, the closing disks 114 push the soil back over the furrow created by the opener disk 100. In the example of FIG. 2, the angle setting or depth setting of the closing disks 114 may be manually revised by turning the closing wheel tension adjuster 108. Proper closing ensures the nutrients get to the seeds and plants rather than be blown away by the wind.

In one example embodiment, the soil opener/closer system 40 of FIG. 2 includes an implement frame bar 51 that is connected to a common tool bar 54 that gangs together a number of opener/closer systems 40. Tool bar 54 and frame bar 51 couple system 40 to the implement frame 50, which in turn is coupled to a vehicle or tillage vehicle such as an agricultural tractor or cultivator, respectively. For example, the tool bar 54 is coupled to an agricultural tractor using a 3-point hitch assembly to the implement frame 50. Alternatively, tool bar 54 is coupled to transport wheel assemblies. In some embodiments, the transport wheels' speed is monitored or the wheels provide ground drive to supply chemicals 22 at a selected rate. The frame bar 51 is coupled to a linkage which is biased in a downward direction with a compression coil spring 102 wrapped around the linkage. A quick-adjust depth adjuster 104 moves the vertical orientation of the gauge wheel 106 relative to soil opener disk 100 to adjust the cutting depth into the soil; the soil opener disk 100 creates a furrow. In various embodiments, the soil opener disk 100 is planar with respect to, or has a convex or concave shape relative to the vehicle travel direction 60. The choice of the design for the opening disks 100 depends on the end-use and on the terrain. In the example of FIG. 2, there is a boot or scraper or boot blade 150 (all referenced as 150) that is used for cleaning or for cutting. The side of the boot/scraper 150 that is adjacent (parallel) to the soil opener disk 100 is positioned at an angle and pressed against the soil opener disk 100 close enough for a scraping operation (e.g. to remove residue or mud from the soil opener disk). Soil opener disk 100 is oriented at an angle of between 4 to 8 degrees relative to the travel direction, but may also be at a different orientation (e.g. FIG. 4). Although the figures (e.g. FIGS. 2 and 3) depict the boot 150 as pressing against a soil opener disk 100 in order to clean the disk, in other embodiments or where the soil is sandy, the boot 150 may not need to scrape the soil opener disk 100. Rather, the boot 150 is behind a large soil cutter in order that the knife edge of the boot 150 cuts a refined, narrow trench or furrow in the ground.

Figure 3:
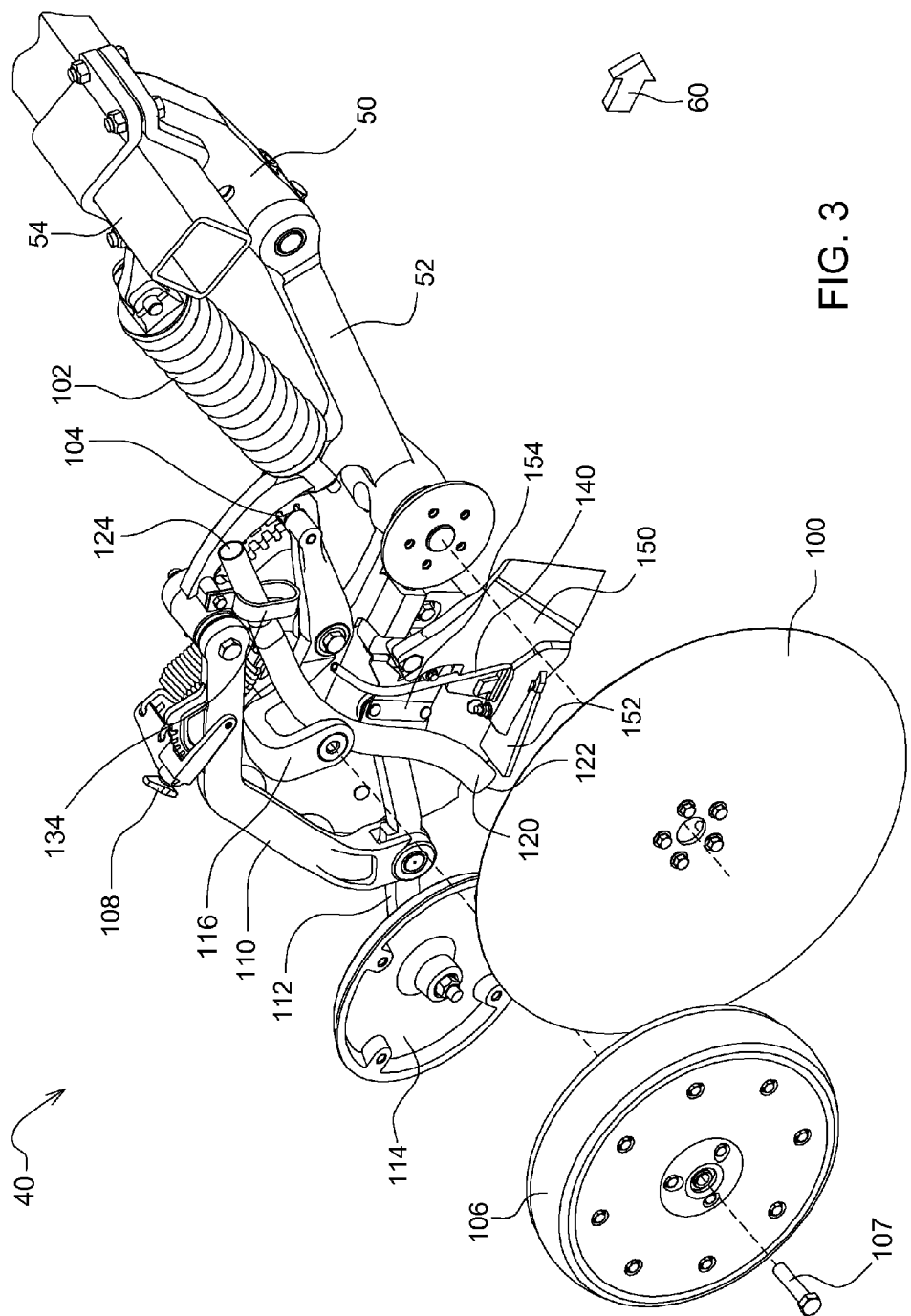
FIG. 3 depicts a partially-exploded view of an example chemical delivery system having a soil opener, delivery tubes and soil closer.

FIG. 3 depicts a partially exploded view of an example opener/closer system 40 having a soil opener disk 100, delivery tubes and soil closer disks 114. The opener/closer system 40 is mounted to and towed by a part of the frame 50 (implement frame bar 51) of the agricultural machine (e.g. tractor, seeder). In the example of FIG. 3, the chemical tube 120 with large diameter (e.g. dry fertilizer tube) is mounted to a rear frame member 52 of the agricultural implement and inside a yoke 116 that shares a common axis with the gauge wheel 106 and frame member 52 of the agricultural machine. Near the middle of the chemical tube 120, there is connector (e.g. bolt, hinge) where the tube 120 is attached to a U-shaped yoke 116 and where the connector aligns with the axis of the gauge wheel 106. The U-shaped yoke 116 is attached to the agricultural machine's frame member 52, to which the boot 150 is also attached. An upper end of the frame member 52 is welded to or formed with the frame bar 51 and frame 50 of the agricultural machine. In the configuration of FIG. 3, the chemical tube 120 has a pivotal degree of freedom so that for example with the aid of terrain sensors, the angle of the chemical tube 120 is adjustable by operator command to conform with the terrain or the soil profile, physical conditions and so on. In addition the frame member 52 moves up and down vertically so that the chemical tube 120 also moves up and down to better or more precisely position where the chemicals are delivered for a particular terrain and location. In one example, the boot 150 is positioned behind soil opener disk 100 relative to travel direction, and extends slightly past the frontal profile of soil opener disk 100 to slightly widen the trench formed in the soil by soil opener disk 100, which also aids delivery of the chemicals.

In example embodiments such as in FIG. 3, the chemical tube 120 is mounted to a rear extension of the boot/scraper 150. The chemical tube 120 itself or the boot 150 includes a tube mounting plate (e.g. 126, 154), providing pivotal coupling with the frame 50. In other example embodiments, the chemical tube 120 is mounted in an external rear of the implement frame 50, more outside (e.g. FIGS. 14, 18) rather than being tightly nestled within a middle section of delivery system 10. In FIG. 3, the boot 150 also includes a plurality of other mounting features (e.g. the depicted tube mounting plate 154) allowing attachment with one or more other chemical tubes 120. The chemical tube 120 is either welded to or formed together with or bolted onto the tube mounting plate 154. Other tubes such as the anhydrous ammonia tube (wet fertilizer tube 140) are also mounted to the boot/scraper 150. Alternatively, smaller tubes such as 140 are mounted parallel to or even onto chemical tube 120. In FIG. 3, the wet fertilizer tube 140 is optionally oriented between 30 to minus 30 degrees from vertical so that its outlet 142 may be positioned either close to the chemical tube outlet 122 or farther away. Wet fertilizer tube 140 has a beveled outlet 142, angled so that the liquid fertilizer discharges in a direction away from the opener disk 100 and towards the soil and walls of the ground trench formed by boot 150 for quick absorption into the soil.

For the embodiment of delivery tubes shown in FIG. 3, there is an example mounting bracket 154 that includes a pair of mounting holes to help attach one or more tubes to the rest of the applicator system 80 for selective or collective application of dry, liquid and/or gaseous chemicals. In this example of FIG. 3, two or more mounting holes are provided for secure attachment or so that the tube(s) would not pivot or otherwise move when attached to the boot 150. In other examples, mounting features include a different number of holes or configuration (e.g. brace) for securing the tubes to the boot 150. In some examples, the chemical tube 120 is arranged on an open part (e.g. opener frame member 110) of the opener/closer system 40 with a mounting plate that contains inserts or openings so as to allow the chemical tube 120 to be fastened to the plate near the soil opener disk 100, boot 150 or closing disk arrangement. Multiple slots in the plate of the arrangement allow for some adjustment of the chemical tube 120 so as to locate the tube outlet 122 at an optimum position or angle in relation to the other chemical tubes 120 or fertilizer tube 140 such as near the trailing end of the boot tail 152 that is used for anhydrous ammonia purposes. In FIG. 3, the boot tail 152 is depicted as being fan or paddle shaped, which prevents the gas from anhydrous ammonia from rising and escaping. The fan width is also larger than the diameter of the chemical tube outlet 122, which helps maintain a clear path for the release of the dry chemicals from chemical tube 120.

In other embodiments, the chemical tube 120 does not have a mounting plate. Instead for example, the tube 120 is directly welded to a frame member (e.g. 110) of the chemical delivery system 10 or the opener/closer system 40; alternatively, the chemical tube 120 has (is formed with) a small flat surface or small plate that eases welding the tube 120 itself to the rear frame member 110 or extensions of the frame. The chemical tube 120 or its outlet 122 is placed near or adjacent to other chemical or fertilizer tubes 120, 140 that deliver liquids or other chemicals. Again, the chemical tube(s) 120 follow a soil boot 150 or other soil cutter or opener since a furrow is created before chemicals are injected into the soil furrow. The chemical tube 120 for dry materials is curved following the shape of the back and rear edge of the soil boot 150 or soil cutter in order to fit into the available space and to save space.

In the example of FIG. 3, the upper part (inlet 124) of the chemical tube 120 is inserted in a hose and hose clamp 139 or a loop that serves as a hose clamp 139 for hoses or tubes that deliver chemicals to the chemical tube 120. The hose is coupled to the chemical hopper 20 via tubes (e.g. distribution conduits 30) and manifolds connected to or coupled to an air combiner underneath the hopper 20. Alternatively, the chemical tube inlet 124 is connected to an outlet conduit of a dry fertilizer distribution system, utilizing a metering and conveyance system. In some embodiments, the chemical tube inlet 124 is circular in cross section with an uniform radius to better mate the chemical tube 120 to commercial hose clamps, hoses and distribution conduits 30 that tend to be also circular in cross section. In a two-dimensional drawing, the chemical tube outlet 122 is oval or an ellipse such that the major axis is at an angle with respect to the soil surface 66 and the minor axis follows the soil. That is, the pointy part of the oval is dragged or touching the soil so as to deliver the chemicals in a more narrow furrow or in a more precise location of the soil. Alternatively, the chemical tube outlet 122 has a pointed spout shaped output and the apex of the pointed spout is positioned closest to the soil surface in order to release the chemicals in a localized area. The sigmoid or partial sigmoid curvature (S-shape) of the chemical tube 120 fits the limited available space in the opener/closer system 40, following an efficient pathway to a desired location in a furrow created by the tillage implement. For example, the diameter of the chemical tube 120 is narrow enough to be free from contact with the yoke 116; and the curvature of the chemical tube 120 leaves room for other tubes and is clear of the soil opener disk 100 or closing disks 114. Most embodiments of the hose, the chemical tube 120 and the sections of the chemical tube 120 are generally positioned vertically or at least more than 45 degrees from the horizontal soil surface 66 so that material would drop down under gravitational force and would not get clogged in the tube 120. For example, the sigmoid curvature does not include horizontal sections. Alternatively, air is blown into the hose and tube sections so that the particles, especially dry chemicals, do not get clumped or clogged while traveling toward the chemical tube outlet 122.

Figure 4:
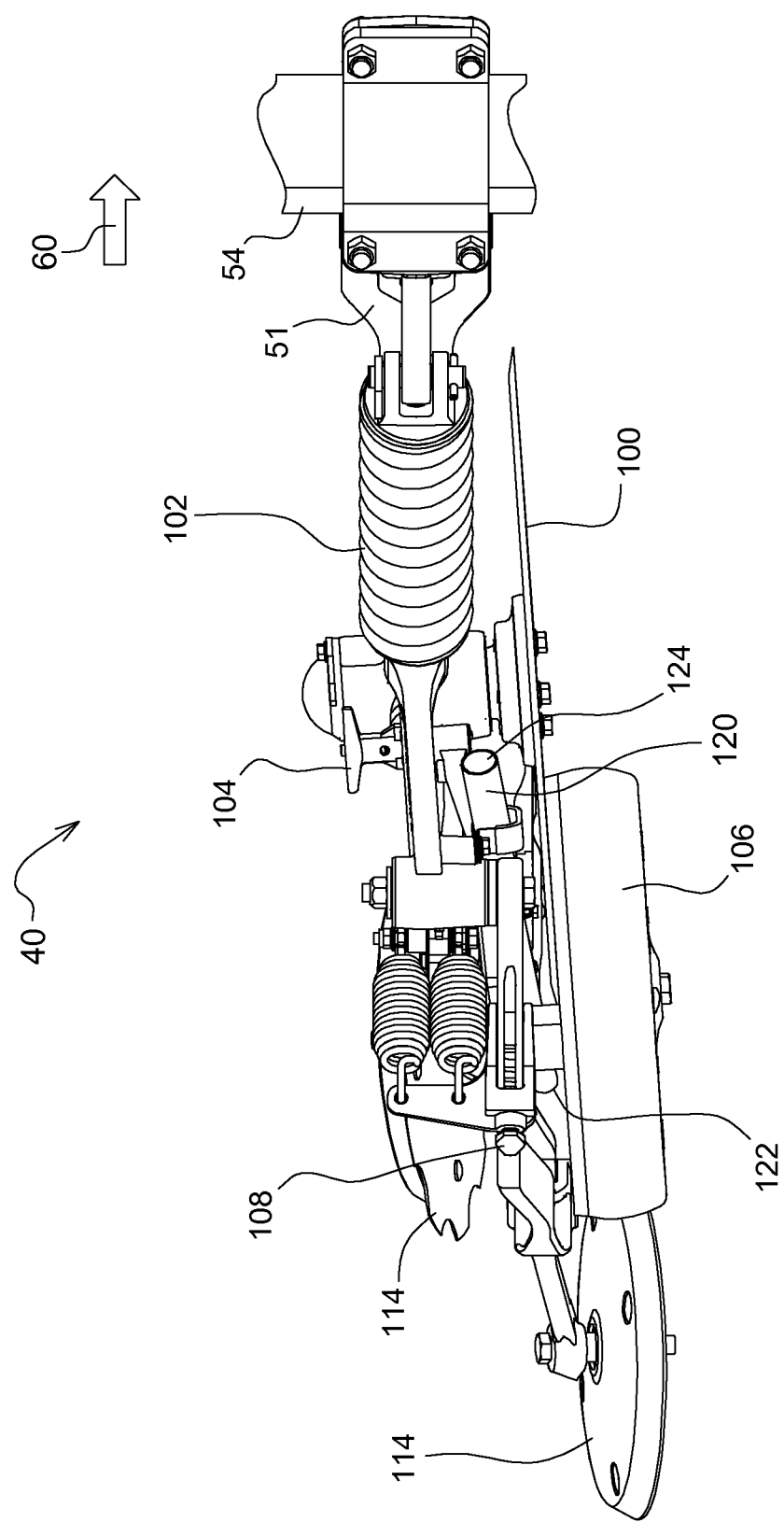
FIG. 4 depicts a top view of part of an example chemical delivery system.

FIG. 4 depicts a top view of an example opener/closer system 40. The inlet 124 and outlet 122 of the chemical tube 120 (e.g. dry fertilizer tube) are visible in the top view. The chemical tube 120 is adjacent to an opener disk 100 and gauge wheel 106. The axis of the chemical tube 120 is approximately 10-15 degrees relative the plane of the opener disk 100 or the plane of the gauge wheel 106. The chemical tube outlet 122 is aligned following the soil opener disk 100 so that the chemicals are released in the furrow created by the soil opener disk 100. Alternatively, the chemical tube outlet 122 is aligned following the blade of the boot soil cutter if the boot 150 does not perform a scraping action. The boot soil cutter creates a narrow trench and the chemical tube outlet 122 diameter or pointy lip of the chemical tube outlet 122 matches the width of the trench so as to optimally place chemicals in the trench.

In the example of FIG. 4, the boot 150 includes a scraper positioned near the leading edge of opener disk 100, adjacent the trench side of opener disk 100. The scraper has a contour closely matching with the trench side of opener disk 100 to scrape mud and debris from the trench side of the opener disk 100. The boot 150 also includes mounting connectors that allows one or more selected tubes (e.g. the tubes with smaller diameters) to be optionally mounted to the boot 150. The boot 150 includes a recess at the lower trailing edge that at least partially surrounds the tubes. The recess protects the smaller tubes from becoming dislodged or damaged during operation. The recess has a generally L-shaped configuration surrounding the tubes on a leading edge of the fertilizer tube and an opener disk 100 side of the smaller tubes.

Figure 5:
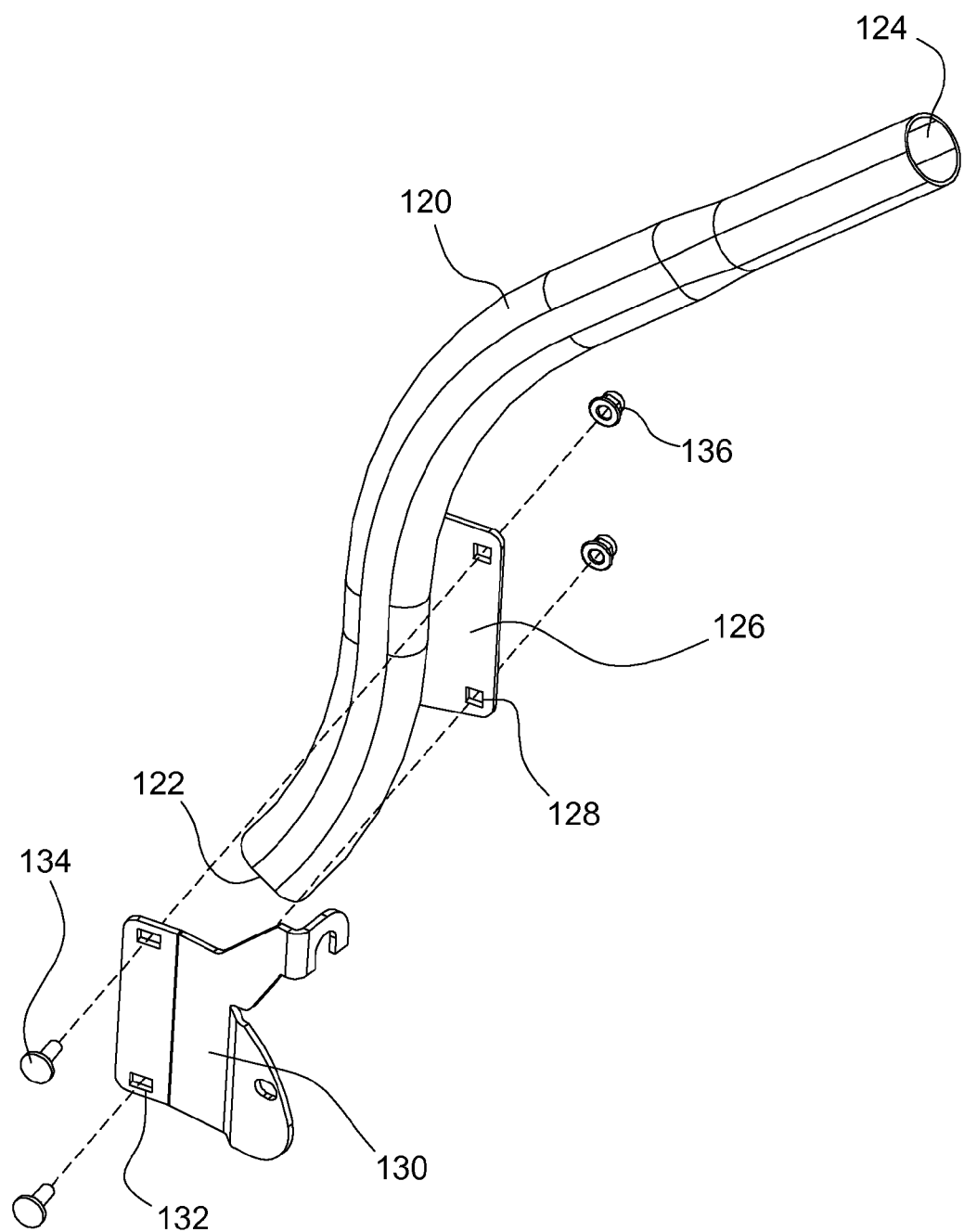
FIG. 5 depicts a perspective view of an example chemical delivery tube.

FIG. 5 depicts a perspective view of an example embodiment of a chemical tube 120. It has a chemical tube inlet 124 where the cross section is circular. Approximately 15%-25% of the tube has a circular cross section. Alternatively, the length of the circular section is determined by the size (length) of the hose or other tube to which the chemical tube inlet 124 is mated. A good fit is made using hose clamps to secure the chemical delivery tube 120 to the hose or other tube. In the perspective side view of FIG. 5, the chemical tube 120 then flares out, or the cross section of the chemical tube 120 becomes oval or ellipse in shape as seen from the side parallel to the major axis (larger diameter side view). The section of the chemical tube 120 having an oval cross section is curved S-shape in this example and the lip of the chemical tube outlet 122 is tilted upward with respect to the horizontal line, as shown in FIG. 5.

In FIG. 5, the chemical tube 120 is welded to or formed with a tube mounting plate 126 that is rectangular in this example. The tube mounting plate 126 is flat and placed against another generally flat surface such as a boot 150 or frame member 110 of the chemical delivery system 10 or opener/closer system 40. The tube mounting plate 126 has holes or slots or openings 128 where bolts or other fasteners are placed. A separate tube mounting bracket 130 has apertures 132 that mate to the holes 128 of the tube mounting plate 126. When mounted to the opener/closer system 40, the chemical tube 120 is sandwiched between the tube mounting plate 126 and the tube mounting bracket 130. Screws, bolts or other fasteners 134 clamp the chemical tube 120 to the tube mounting plate 126 and to the surface that the mounting plate 126 contacts. In the example of FIG. 5, the tube mounting bracket 130 has a hook, crook and extensions (with additional fastener slots) that mate to the surface structure where the chemical tube 120 is mounted. The hook, crook and extensions further secure (box in) the chemical tube 120 to a desired location as the tillage implement rides and travels over sometimes rough terrain.

Figure 6B:
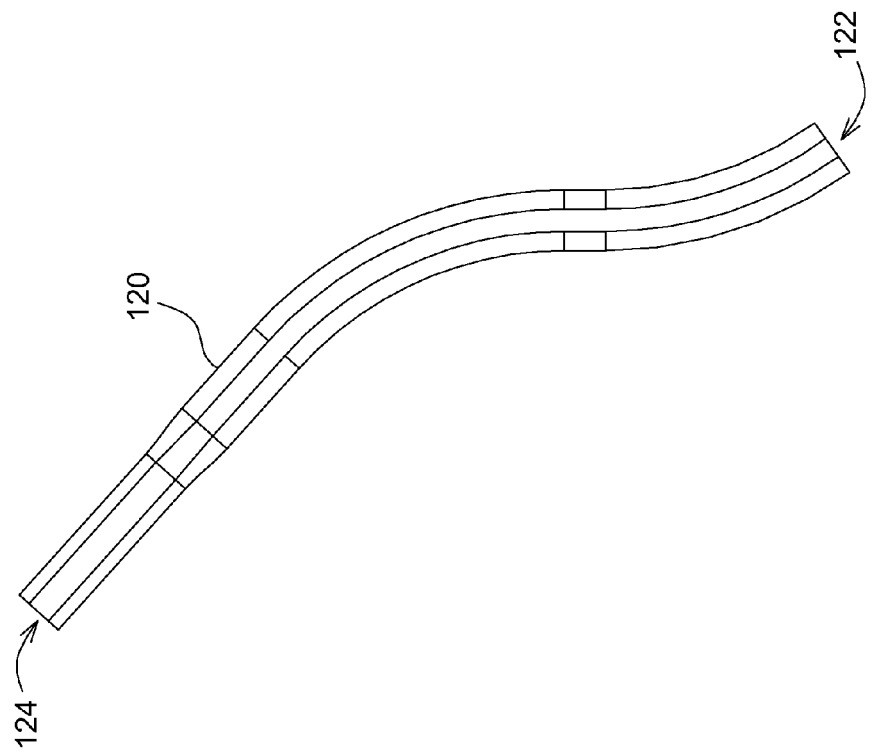
FIG. 6B depicts a side view of an example chemical delivery tube, along with the dimensions and curvature of the tube.
Figure 6A:
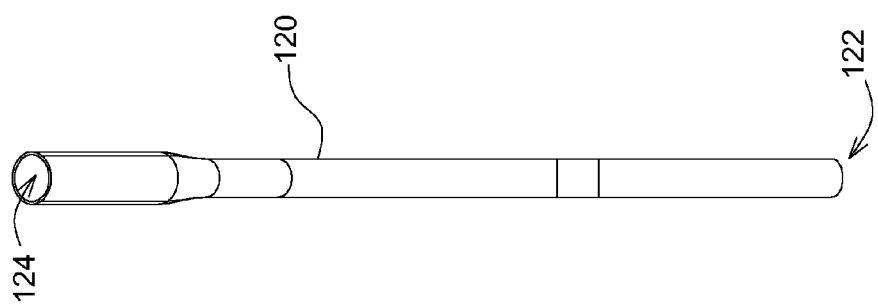
FIG. 6A depicts a top side view of an example chemical delivery tube, along with the dimensions and curvature of the tube.

FIGS. 6B and 6A depicts side and top views, respectively, of the example chemical delivery tube 120 of FIG. 5, along with the dimensions and curvature of the tube. The chemical tube 120 has a circular cross section at the inlet 124, with an outer diameter of 31 to 33 mm, centered on 32 mm. The chemical tube 120 has an ellipse cross section at the outlet end 122, having a major axis diameter of about 36-37 mm and a minor axis diameter of about 23-24 mm. The length of the chemical tube 120 is about 149-151 mm where the flaring or swedging begins. The tube 120 is straight for about 214-216 mm, when it starts to curve downward ("downward" in FIG. 6B). The angle of curvature from the straight section to the downward section is about 48 degrees, or 47-49 degrees from vertical (with respect to the page). The downward curve section has a 25 mm section where the perimeter of the chemical tube 120 is vertical (with respect to the page). Below the 25 mm section, the chemical tube 120 starts to inflect upwards at an angle of 144-146 degrees with respect to vertical (or about 36 degrees with respect to vertical); the chemical tube outlet 122 has an upward inflection at the lip of about 54-55 degrees with respect to a horizontal axis. The entire length of the chemical tube 120 is 384-386 mm. Alternatively, in FIG. 6B if the tube 120 were straightened, the entire length of the tube 120 is about 655-705 mm. By contrast, in FIG. 6B, the tip-to-tip length (upper tip to lowermost tip) of the tube 120 is about 560 to 562 mm plus or minus manufacturing errors. The height of the tube 120 in the orientation depicted in FIG. 6A is about 530-540 mm. The thickness of the tube 120 is approximately 4 to 5 mm. The dimensions assume a manufacturing precision of about ±1 mm (one sigma); if the precision is worse, the range of the dimensions is wider. The large diameter of the chemical tube 120 permits the flow of solid chemicals such as crystalline high-nitrogen fertilizers. If the chemicals crystallize and clump to the chemical tube 120, the large diameter also permits easy cleaning and flushing of the tube 120. As such, some embodiments of the tube 120 have diameters larger than the values listed. The dimensions of the tube 120 sets the scale of the narrow spacing in which the tube 120 fits.

Various embodiments of the example chemical tubes 120 are made of stainless steel; alternatively, they are made from alloys, aluminum, low-carbon steel, heat-treated high-carbon steel, carbon fiber, PVC (vinyl chloride), CPVC, and so on. The chemical tube 120 is formed from a tube having a circular cross section, then part way along the tube, it is swedged from being circular to an oval or ellipse in cross section. In a two-dimensional side profile, the tube 120 flares out. Alternative to swedging, the metal (e.g. low-carbon steel) is work hardened or cold formed so as to strengthen the metal by plastic deformation. As another alternative, the shaped of the chemical tube 120 is achieved by hydroforming. For example, to hydroform an alloy into the agricultural implement's frame rail, a hollow tube of the alloy is placed inside a negative mold that has the shape of the desired result. High pressure hydraulic pumps then inject fluid at very high pressure inside the alloy tube, which causes the tube to expand until it matches the mold. The hydroformed alloy is then removed from the mold. If the material is plastic, fiber or a composite, injection molding one method of making the tube 120. Injection molded plastics are light weight and do not rust; examples include those depicted in FIGS. 22 and 23 As 3-d printing becomes more cost effective, this is another way to manufacture the chemical tubes 120. For example, direct metal printers create chemically pure, fully dense metal parts, and they deliver accuracy compatible with EN ISO 2768 (fine) machining tolerances and a repeatability of about 20 microns in all three axes (x-y-z directions). Printable materials include stainless steel, tool steel, super alloys, non-ferrous alloys, precious metals and alumina. Unlike metal, if the chemical tube 120 is made of PVC, PVC-type pipes can be made from injection molding, 3-D printing, and be heat treated to alter its shape or be heat fused to other objects.

Figure 7:
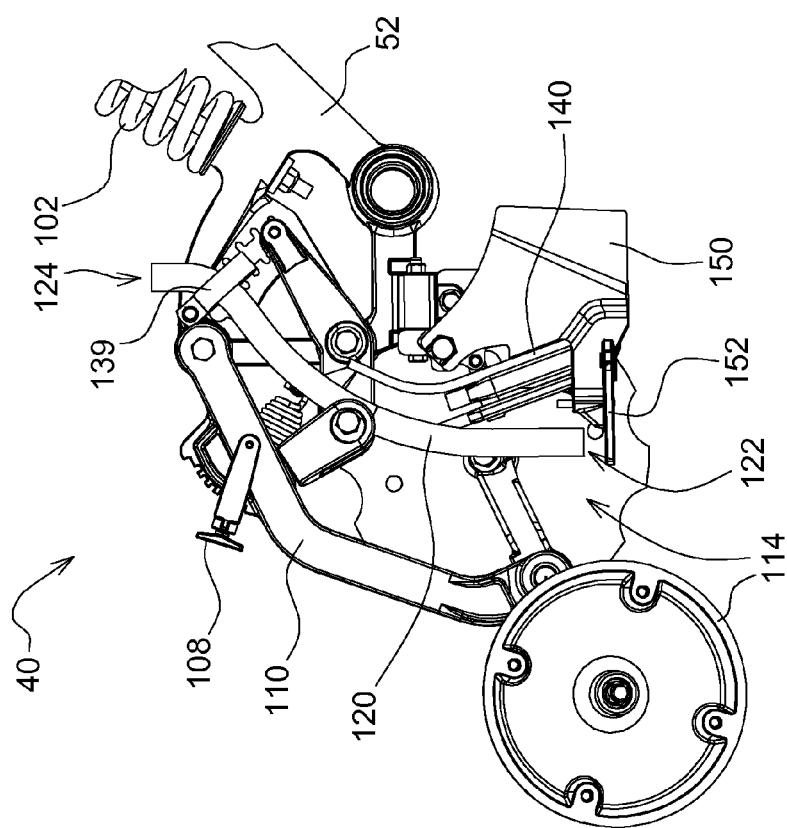
FIG. 7 depicts a side view of part of another example chemical delivery system.

FIG. 7 depicts a side view of another embodiment of an opener/closer system 40 having a soil opener disk 100 (not shown), boot or scraper blade 150, delivery tubes (e.g. 120), and soil closing disks 114. The chemical tube 120 is curved so that its lower section is nearly perpendicular to the surface of the ground. The lower outlet lip 122 of the chemical tube 120 is parallel to the surface of the ground. The upper part of the chemical tube 120 is vertical and then the tube 120 is bent in a shape of an arc before meeting the mid to lower section of tube 120. The chemical tube 120 is located behind a soil boot blade 150 (opposite the direction of vehicle travel 60). The chemical tube 120 is mounted or welded to either a frame member 110, the depth adjuster 104, the yoke 116, or a rear extension of the boot 150. In this example figure, the closing disk is lowered down relative to the soil boot blade 150 and chemical tube 120. In operation, the chemical tube 120 releases solid chemicals from above the soil surface as shown in FIG. 7. Alternatively, the chemical tube 120 is lowered down to the soil surface or below the soil surface. In some embodiments, the lowering is performed by electronic command or manual levers. In this example, other delivery tubes (e.g. for anhydrous ammonia, wet chemicals, or other types of solid chemicals) are positioned between the chemical tube 120 and the boot blade 150.

Figure 8:
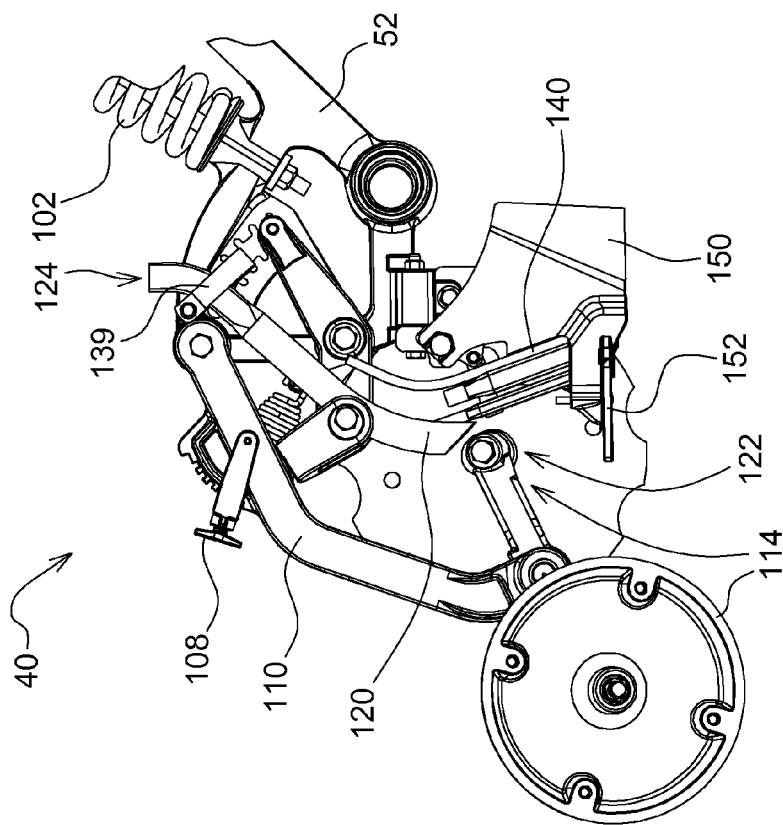
FIG. 8 depicts a side view of part of another example chemical delivery system.

FIG. 8 depicts a side view of another example opener/closer system 40 having a soil opener disk 100 (not shown), boot or scraper blade 150, delivery tubes (e.g. 120), and soil closing disks 114. The chemical tube 120 is curved, having a long section that is approximately 50 to 60 degrees from the horizontal, and then curving to a lower section is nearly vertical with respect to the surface of the ground. The lower outlet lip 122 of the chemical tube 120 is at 45 to 50 degree edge relative to the surface of the ground. The outlet lip 122 comes to a point on the side near other chemical tubes 120 and the scraper blade. The upper part of the chemical tube 120 is vertical and then the tube 120 is bent in a shape of an arc before meeting the mid to lower section of tube 120. The chemical tube 120 is located behind a soil boot blade 150 (opposite the direction of vehicle travel 60). The chemical tube 120 is welded to or mounted to either a rear frame member 110, the depth adjuster 104, the yoke 116, or a rear extension of the boot 150. In this example figure, the closing disk happens to be lowered down relative to the soil boot blade 150 and chemical tube 120. In operation, the chemical tube 120 releases solid chemicals from above the soil surface as shown in FIG. 8. Alternatively, the chemical tube 120 is lowered down to the soil surface or below the soil surface. The lowering is performed by electronic or hydraulic command or manual levers. In this example, other delivery tubes (e.g. for anhydrous ammonia, wet chemicals, or other types of solid chemicals) are positioned between the chemical tube 120 and the boot blade 150.

Figure 9:
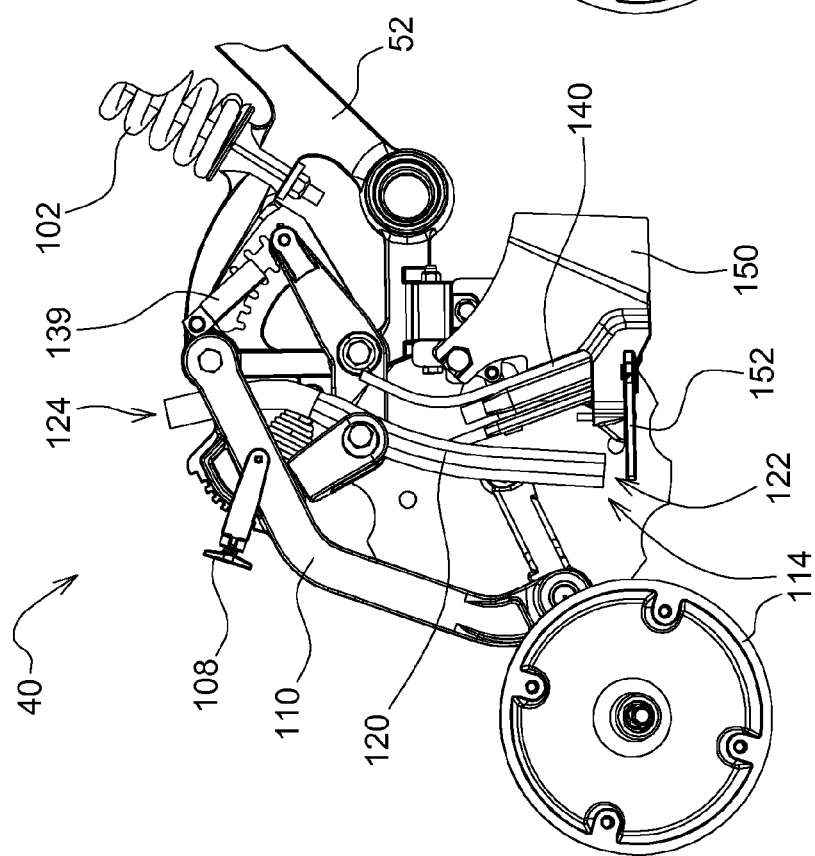
FIG. 9 depicts a side view of part of another example chemical delivery system.

FIG. 9 depicts a side view of another example opener/closer system 40 having a soil opener disk 100 (not shown), boot or scraper blade 150, delivery tubes (e.g. 120), and soil closing disks 114. The chemical tube 120 is over 60% vertical with respect to surface of the ground. The outlet lip 122 makes an angle of about 10-15 degrees from the surface of the ground. The other smaller delivery tubes (e.g. for anhydrous ammonia, wet chemicals, or other types of solid chemicals) are positioned between the chemical tube 120 and the boot blade 150. In this example, the output of the other smaller chemical tubes point away from the (large) chemical tube outlet 122. The upper part of the chemical tube 120 is bent towards the soil opener disk 100 (opposite the direction of vehicle travel 60) and then straightens out to vertical. The chemical tube 120 is mounted to either a rear frame member 110, the depth adjuster 104, the yoke 116, or a rear extension of the boot 150. In operation, the chemical tube 120 releases solid chemicals near the soil surface as shown in FIG. 9. Alternatively, the chemical tube 120 is lowered farther down to the soil surface or below the soil surface. In some embodiments, the lowering is performed by electronic or hydraulic feedback or manual levers.

Figure 10:
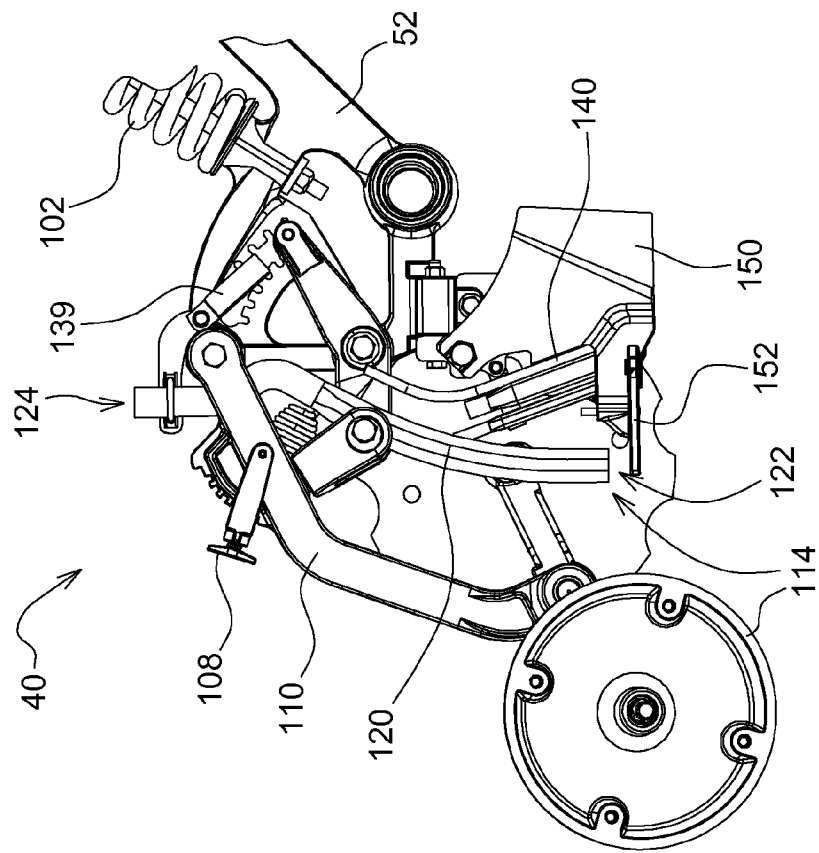
FIG. 10 depicts a side view of part of another example chemical delivery system.

FIG. 10 depicts a side view of another example opener/closer system 40 having a soil opener disk 100 (not shown), boot or scraper blade 150, delivery tubes (e.g. 120), and soil closing disks 114. The chemical tube inlet 124 is vertical with respect to the ground and then kinks towards the soil opener disk 100 (opposite the direction of vehicle travel 60), curves and then straightens out to vertical. The chemical tube outlet 122 lip is horizontal and parallel with respect to the surface of the ground. The other smaller delivery tubes (e.g. for anhydrous ammonia, wet chemicals, or other types of solid chemicals) are positioned between the chemical tube 120 and the boot blade 150. In this example, the output of the other smaller chemical tubes point away from the (large) chemical tube outlet 122. The chemical tube 120 is mounted or welded to either a rear frame member 110, the depth adjuster 104, the yoke 116, or a rear extension of the boot 150. In operation, the chemical tube 120 releases solid chemicals near the soil surface as shown in FIG. 10. Alternatively, the chemical tube 120 is lowered farther down to the soil surface or below the soil surface. In some embodiments, the lowering is performed by electronic and/or hydraulic command or manual levers.

Figure 11:
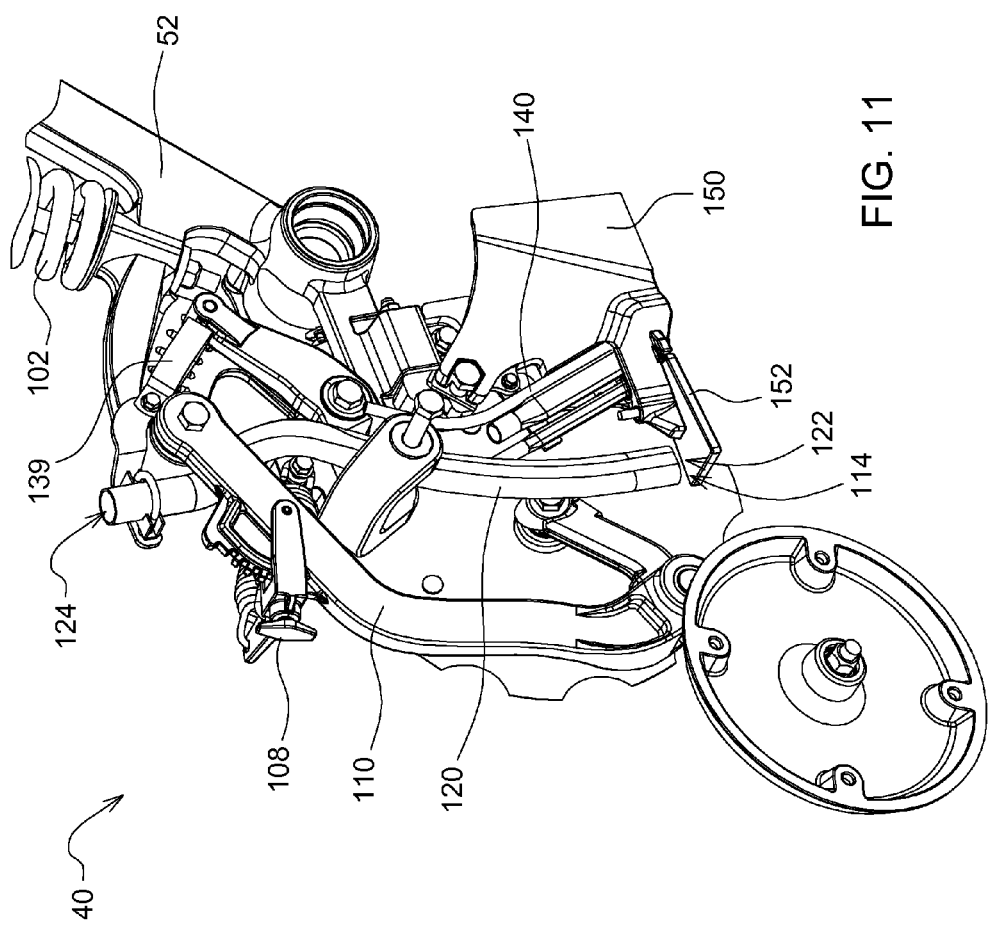
FIG. 11 depicts a rear view of the example chemical delivery system of FIG. 10.

FIG. 11 depicts a back rear view of the example opener/closer system 40 in FIG. 10 having a soil opener disk 100 (not shown), boot or scraper blade 150, delivery tubes (e.g. 120), and soil closing disks 114. The chemical tube inlet 124 is vertical with respect to the ground and then kinks towards the soil opener disk 100 (opposite the direction of vehicle travel 60), curves and then straightens out to vertical. The upper section of the chemical tube 120 curves out towards the soil closing disk such that the chemical tube 120 does not entirely lie within a single plane.

FIG. 12 depicts a side view of another example opener/closer system 40 having a soil opener disk 100 (not shown), boot or scraper blade 150, delivery tubes (e.g. 120), and soil closing disks 114. The chemical tube 120 is curved, having a vertical inlet section, followed by a curve section that is approximately 50 to 60 degrees from the horizontal, and then curving to a lower section that is nearly vertical with respect to the surface of the ground. The chemical tube 120 embodiment of FIG. 12 is similar to that of FIG. 8, but the tube length is longer and the curvature is gentler. The lower outlet lip 122 of the chemical tube 120 is at 45 to 50 degree edge relative to the surface of the ground. The outlet lip 122 comes to a point on the side near the other chemical tubes 120 and the scraper blade 150. The chemical tube 120 is located behind a soil boot blade 150 (opposite the direction of vehicle travel 60). The chemical tube 120 is welded to or mounted to either a rear frame member 110, the depth adjuster 104, the yoke 116, or a rear extension of the boot 150. In this example figure, the closing disk happens to be lowered down relative to example shown in FIG. 8. In operation, the chemical tube 120 releases solid chemicals from above the soil surface as shown in FIG. 12. Alternatively, the chemical tube 120 is lowered down to the soil surface or below the soil surface. In some embodiments, the lowering is performed by electronic command or hydraulic feedback or manual levers.

FIG. 13 depicts a side view of another example opener/closer system 40 having a soil opener disk 100 (not shown), boot or scraper blade 150, delivery tubes (e.g. 120), and soil closing disks 114, that are similar to that of FIG. 12. The curvature of the chemical tube 120 in FIG. 13 includes more pronounced bends as compared the smoother curves, more rounded bends of the chemical tube 120 shown in FIG. 12. For example, the chemical tube 120 in FIG. 13 includes straight sections followed by an angular turn (about 120 to 130 degrees) to the next straight section. The lower outlet lip 122 of the chemical tube 120 is at 45 to 50 degree edge relative to the surface of the ground. The outlet lip 122 comes to a point on the side near the other chemical tubes 120 and the scraper blade 150. The chemical tube 120 is located behind a soil boot blade 150 (opposite the direction of vehicle travel 60). The chemical tube 120 is welded or mounted to either a rear frame member 110, the depth adjuster 104, the yoke 116, or a rear extension of the boot 150. In operation, the chemical tube 120 releases solid chemicals from above the soil surface as shown in FIG. 13. Alternatively, the chemical tube 120 is lowered down to the soil surface or below the soil surface. The lowering is performed by electronic command or hydraulic feedback or manual levers.

Figure 14:
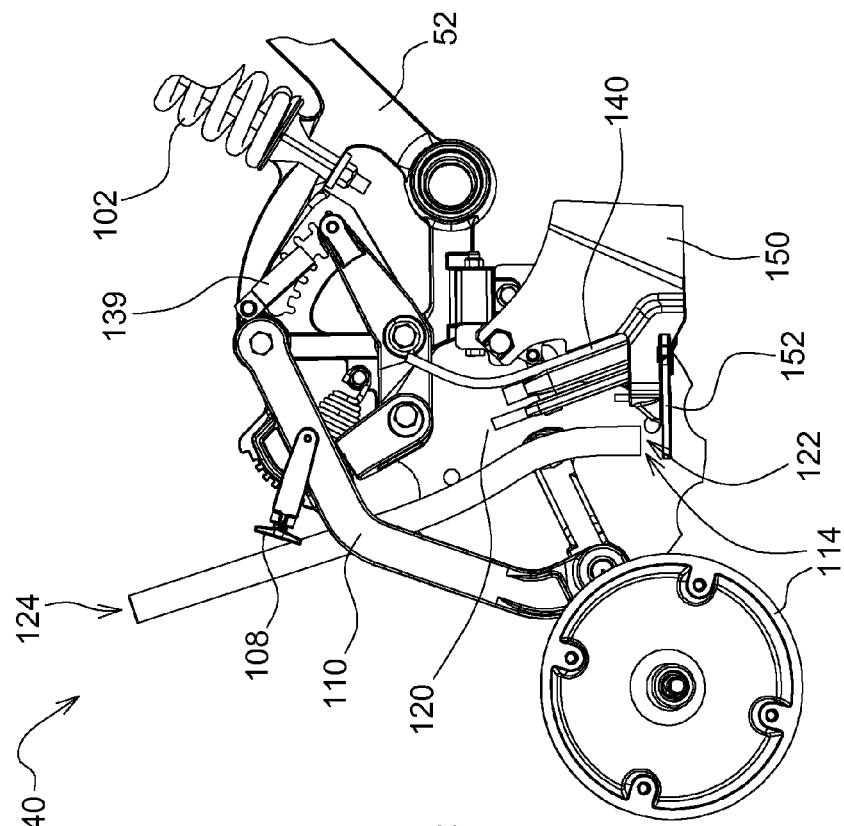
FIG. 14 depicts a side view of part of another example chemical delivery system.

FIG. 14 depicts a side view of another example opener/closer system 40 having a soil opener disk 100 (not shown), boot or scraper blade 150, delivery tubes (e.g. 120), and soil closing disks 114. The chemical tube inlet 124 is approximately 10-20 degrees from vertical, and is outside the rear of the frame and frame members of the chemical delivery system 10 or opener/closer system 40. The chemical tube 120 in FIG. 14 includes straight sections followed by an angular turn (about 100 to 120 degrees) to the next straight section. The lowest section of the chemical tube 120 is vertical with respect to the surface of the ground. The lower outlet lip 122 of the chemical tube 120 is parallel relative to the surface of the ground. The chemical tube 120 is located behind a soil boot blade 150 (opposite the direction of vehicle travel 60). The chemical tube 120 is welded or mounted to either a frame member 110, the depth adjuster 104, the yoke 116, or a rear extension of the boot 150. As an alternative to FIG. 14, since the top of the chemical tube 120 is already external to the delivery system 10, the chemical tube 120 as well as the other tubes are all positioned more externally rearward and closer to the soil closing disk 114 or device so that delivered chemicals are immediately covered by soil. In operation, the chemical tube 120 releases solid chemicals from above the soil surface as shown in FIG. 14. Alternatively, the chemical tube 120 is lowered down to the soil surface or below the soil surface. In some embodiments, the lowering is performed by electronic command or hydraulic feedback or manual levers.

Figure 15:
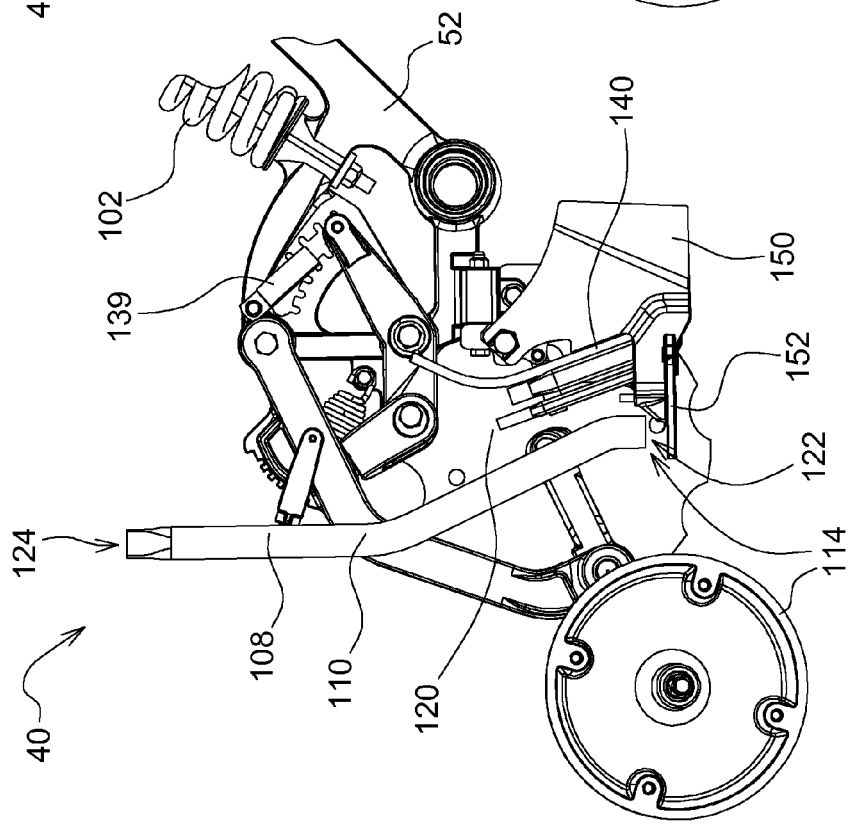
FIG. 15 depicts a side view of part of another example chemical delivery system.

FIG. 15 depicts a side view of another example opener/closer system 40 having a soil opener disk 100 (not shown), boot or scraper blade 150, delivery tubes (e.g. 120), and soil closing disks 114. The chemical tube 120 in FIG. 15 is similar to that in FIG. 14, where the chemical tube inlet 124 points away (about 30-40 degrees away) from the opener/closer system 40 and is outside the rear of the frame and frame members 110 of the system 40. The chemical tube 120 in FIG. 15 bends from side to side (occupies more width) relative to the direction of travel so that the tube 120 weaves to one side of the rear frame member 110 relative to the walking beam for the closing wheel. By contrast, in FIG. 14, the chemical tube 120 occupies one side of the walking beam and the rear frame member 110 such that the chemical tube 120 lies mostly on a plane.

Figure 17:
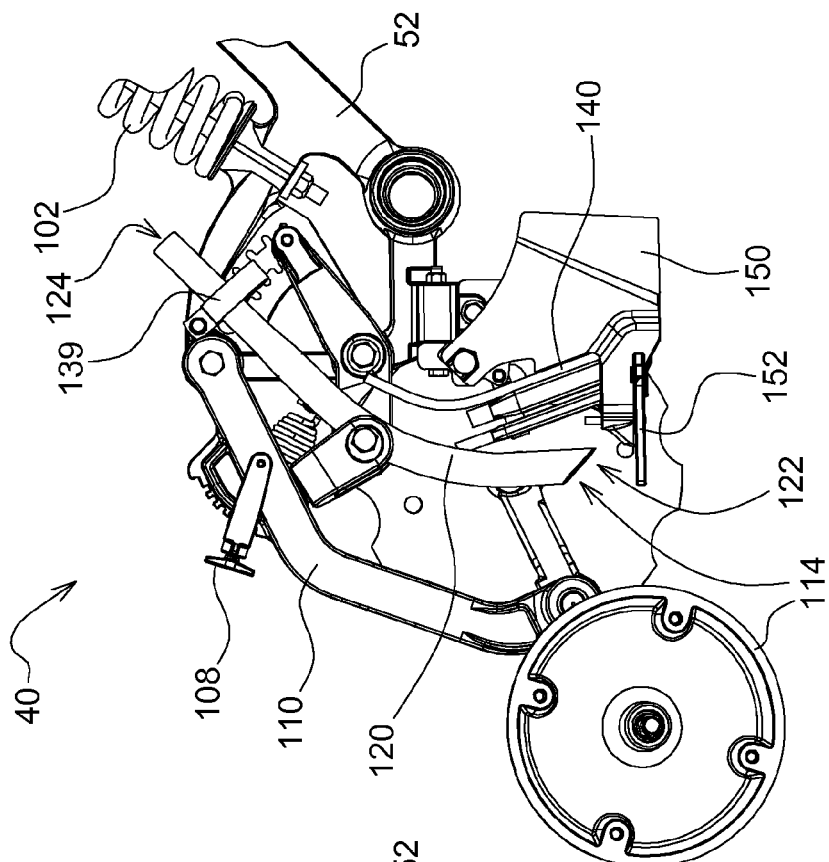
FIG. 17 depicts a side view of part of another example chemical delivery system.
Figure 16:
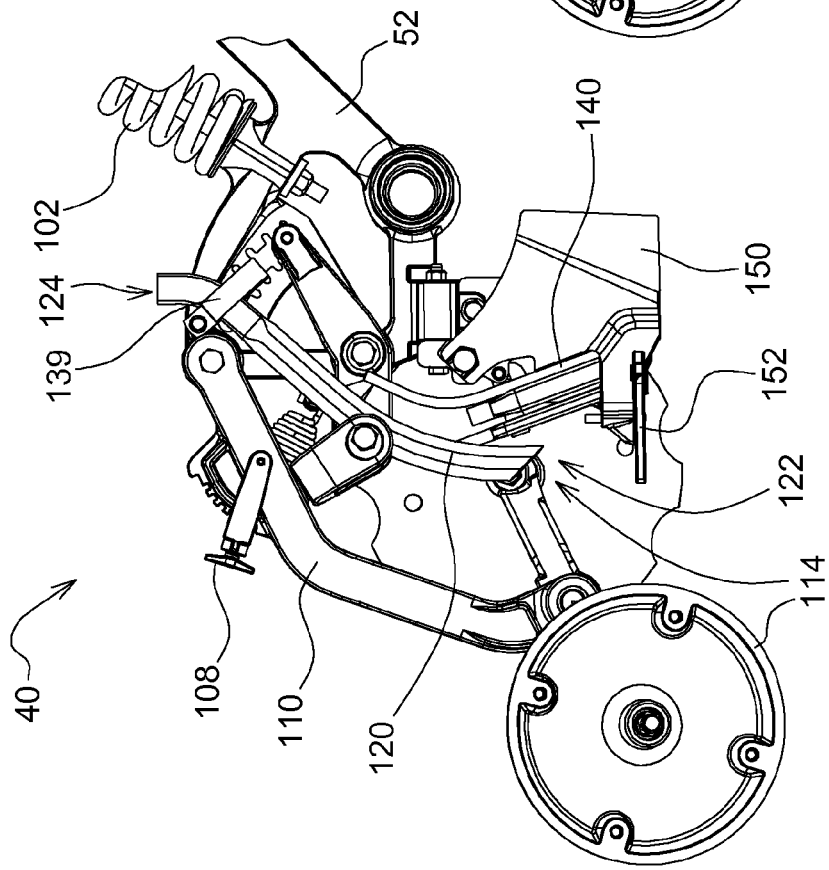
FIG. 16 depicts a side view of part of another example chemical delivery system.

FIGS. 16, 17 and 20 depict a side view of additional examples of the opener/closer system 40 having a soil opener disk 100 (not shown), boot or scraper blade 150, delivery tubes (e.g. 120), and soil closing disks 114. The chemical tubes 120 shown in FIGS. 16 and 17 are similar to that in FIG. 8, but are positioned lower down towards the ground relative to the entire chemical delivery assembly. In yet other embodiments, the chemical tube 120 have other angles of curvature. For example, instead of a beveled chemical tube outlet 122, the section of the tube 120 near the outlet curves downward and the lip of the outlet is parallel or nearly flush with the surface of the ground (e.g. lower end of the chemical tube 120 in FIG. 15). In other alternatives, the relative lengths of the swedged to non-swedged sections (or flared to non-flared sections) are different so that some chemical tubes 120 have a longer section with a circular cross section than an oval cross section. For example, FIGS. 20 and 21 are similar but the chemical tubes 120 have different lengths of the non-swedged sections.

Figure 18:
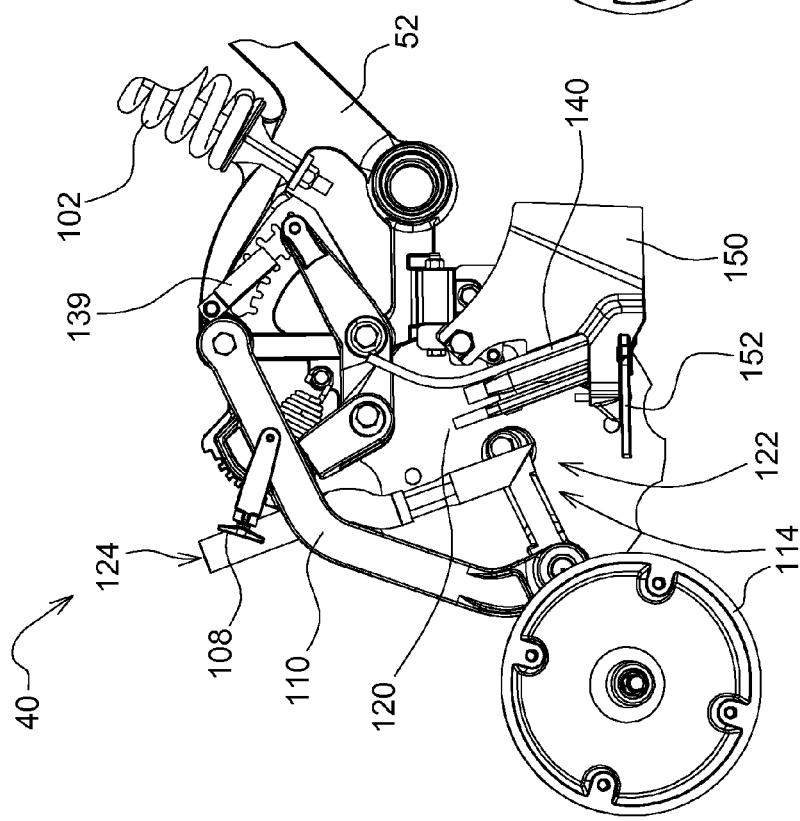
FIG. 18 depicts a side view of part of another example chemical delivery system.

FIG. 18 depicts a side view of another example opener/closer system 40 having a soil opener disk 100 (not shown), boot or scraper blade 150, delivery tubes (e.g. 120), and soil closing disks 114. The chemical tube 120 is a straight section with little curvature except the sectional portion where the tube 120 transitions from having a circular cross section to an ellipse cross section. The chemical tube inlet 124 mates to another tube ("delivery tube" or hose) that delivers chemicals to the chemical tube 120. The delivery tube or hose receives its chemicals from the chemical hopper. Otherwise, the chemical tube 120 and the delivery tube to which it is mated, are positioned approximately 35-40 degrees from vertical, and together both are outside the rear of the frame and frame members 110 of the chemical delivery system 10 or opener/closer system 40. The lowest section of the chemical tube 120 is beveled with respect to the surface of the ground. The lower outlet lip 122 of the chemical tube 120 is pointed on the side closest to the boot or scraper 150. The chemical tube 120 is located following a soil boot blade 150 (opposite the direction of vehicle travel 60). The chemical tube 120 is welded or mounted to either the rear frame member 110, the depth adjuster 104, the yoke 116, or a rear extension of the boot 150. Alternatively, the chemical tube 120 is fitted tightly to the delivery tube and the delivery tube is welded to the frame member 110.

Figure 19:
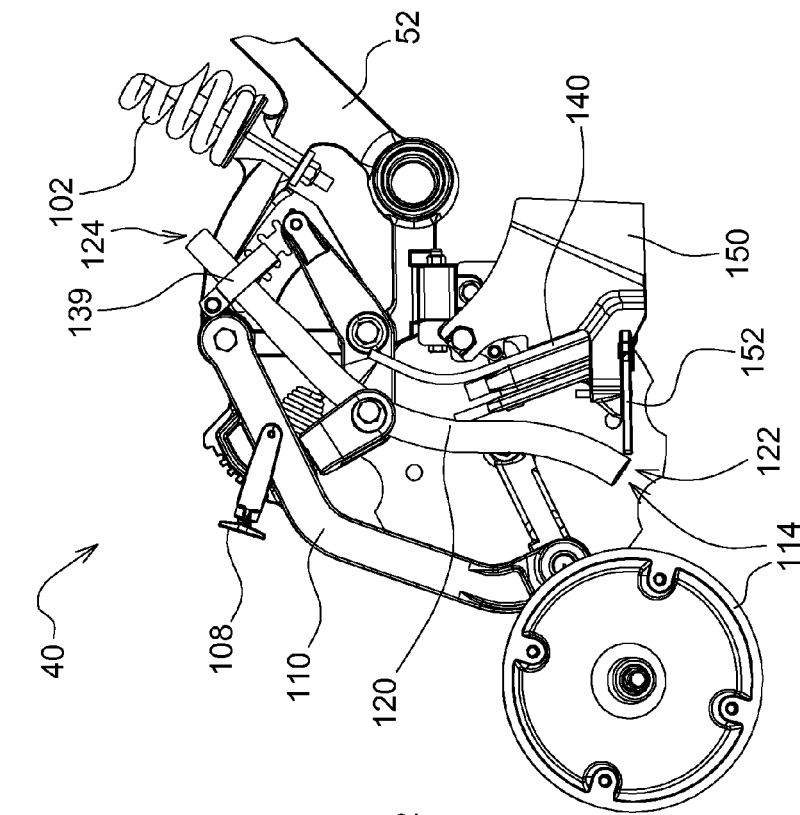
FIG. 19 depicts a side view of part of another example chemical delivery system.

FIG. 19 depicts a side view of another example opener/closer system 40 having a soil opener disk 100 (not shown), boot or scraper blade 150, delivery tubes (e.g. 120), and soil closing disks 114. The chemical tube inlet 124 is approximately 10-20 degrees from vertical, and is outside the rear of the frame and frame members 110 of the chemical delivery system 10 or opener/closer system 40. The chemical tube 120 in FIG. 19 includes straight sections followed by an angular turn (about 100 to 120 degrees) to the next straight section. The lowest section of the chemical tube 120 is vertical with respect to the surface of the ground. The lower outlet lip 122 of the chemical tube 120 is parallel relative to the surface of the ground. The chemical tube 120 is located behind a soil boot blade 150 (opposite the direction of vehicle travel 60). The chemical tube 120 is welded to or mounted to either the rear frame member 110, the depth adjuster 104, the yoke 116, or a rear extension of the boot 150.

In example operation, the embodiments for seeders or nutrient/chemical applicators include a tractor or other vehicle that tows the chemical delivery systems 10, opener/closer systems 40 and large chemical hopper 20 and other possible chemical storage tanks. Alternatively, small individual hoppers carrying chemicals may be substituted for one large hopper 20; individual small hoppers are mounted on top of each chemical delivery system 10 or on top of a gang of the systems 10. In the case of hopper 20, it may be pre-loaded with dry chemicals 22 or fertilizers. At the bottom of hopper 20, there are ducts or release holes for chemicals 22 to drop downwards. Augers 26 at the bottom of or underneath the hoppers 20 rotate or push the chemicals 22 through the ducts towards an air combiner 28. The air combiners 28 are below the augers 26 and hopper 20; in other embodiments, they are positioned adjacent to the hopper 20. Air combiner 28 includes chambers or orifices where the chemicals 22 and airflow meet. Fans such as at the back of the hopper 20 blow air that enters the air combiner 28 to move the chemicals 22 from hopper 20 towards manifolds and distribution conduits 30. Near the end of the distribution conduits 30, the blown air is eventually separated out and released into the atmosphere after the chemicals 22 are well on their way towards the final inlet or upper portion of individual chemical tubes such as the chemical tube 120. Often simultaneously, but separately, a liquid chemical tank services and supplies anhydrous ammonia through manifolds and pipes to fertilizer tubes 140. In the case of ammonia, the tank is refrigerated. By contrast, the dry chemical hopper 20 is often left at atmospheric temperature. Meanwhile, within the opener/closer system 40, the opener disk 100 cuts a furrow in the soil as the vehicle moves forward in the travel direction 60. The chemicals 22 are released from the various tubes. For example, the chemical tube 120 ejects a dry fertilizer (e.g. phosphorous, potassium), and the fertilizer tube 140 and pipette ejects a wet fertilizer (e.g. anhydrous ammonia). The dry fertilizer is released from the chemical tubes 120 in the furrow at a depth and horizontal distance that is close (within four inches) to the wet or other types of chemicals. The wet fertilizer is conveyed through a tube 140 arrangement that passes along a wall of the boot/scrapper 150, and then to the furrow. The soil penetration of the boot 150 (furrow depth) is controlled by a depth adjuster 104 that sets the position of the gauge wheel 106 in relation to the boot 150 and the opener disk 100. Both the liquid and dry chemicals are deposited within a few inches under the soil surface. In other examples, the furrow is dug deeper for certain types of chemicals, or for time-release type of chemicals. A tail 152 is attached to a rear bottom of the boot 150 to help prevent the anhydrous gases from escaping before the closing wheels close soil over the furrow. The soil closing disks 114 then pushes soil over the furrow as quickly as possible to prevent the chemicals' vapors or anhydrous ammonia from escaping or blowing away.

Due to space restrictions in the confines of the chemical delivery system 10, it is not easy to route a dry chemical (e.g. fertilizer) conveying tube 120 with an efficient path to an optimum location in the furrow. As the delivery point of the dry chemical moves farther away from and behind the delivery point of the wet chemicals, the closing disks may already start to close the furrow and thus the dry chemical is not deposited at a desired depth or location. Accordingly, in many embodiments, the dry and wet chemical tubes 120 are shaped, curved and positioned so as to run in parallel or adjacent to one another, and their respective outlets are positioned in close proximity (less than four inches). Further, the same tube configuration depicted in FIG. 5 can be manufactured using various materials. For example, FIGS.

22 and 23 depict example upper portions of a delivery tube 200 made of a man-made material such as polymers or composites (e.g. fiberglass or carbon fiber and plastics). Manufacturing methods for both tube sections 200 include injection molding or 3-D printing. Injection molding of the tube section 200 may form the tube from two or more pieces and then plastic welding or heating joins the pieces together. To improve the alignment and locking together the pieces, mated protrusions 206 and 208 exist on an outer surface of the tube sections 200, as shown in FIG. 22. By contrast, the version in FIG. 23 includes a mating scheme where one edge surface of one piece wraps over the other piece along the long axis of the tube 120. The tube sections 200 also include extensions 202 and 210 with apertures 204 and 212, respectively, to help secure the tube sections 200 to the rest of the chemical delivery system 10. If the polymer or composite tubes 200 are substituted for the metallic version in FIG. 5, the dimensions can be kept the same. Like the version in FIG. 5, the upper cross section or opening 224 in FIG. 22 or 23 is round, but the lower opening is oval or spout shaped to help place the dry fertilizer in a narrower soil trench opening.

Finally, the orientation and directions stated and illustrated in this disclosure should not be taken as limiting. Many of the orientations stated in this disclosure and claims are with reference to the direction of travel of the equipment. But, the directions, e.g. "behind," are merely illustrative and do not orient the embodiments absolutely in space. That is, a structure manufactured on its "side" or "bottom" is merely an arbitrary orientation in space that has no absolute direction. Also, in actual usage, for example, the equipment may be operated or positioned at an angle because the implements may move in many directions on a hill; and then, "top" is pointing to the "side." Thus, the stated directions in this application may be arbitrary designations.

In the present disclosure, the descriptions and example embodiments should not be viewed as limiting. Rather, there are variations and modifications that may be made without departing from the scope of the appended claims.

What is claimed is:

1. A chemical delivery system comprising: a ground working implement frame coupled to an opener-closer system; the opener-closer system having a cutting-edge that creates a furrow in a soil; a tube mounted to the opener-closer system following the cutting-edge of the opener-closer system and arranged rearwardly and proximate a tail member of a boot or scraper; the tube having an inlet with a circular cross section of a uniform radius; the tube having an outlet with an oval cross section that is positioned behind a dispensing opening of a liquid chemical tube arranged forward of the tail member of the boot or scraper relative to a direction of travel; between the inlet and the outlet, a cross section of the tube transitions from circular to oval, wherein a diameter of the cross section of the outlet is smaller in size than a rear edge width of the tail member; and the tube positioned in the opener-closer system to dispense chemicals into the soil.

2. The chemical delivery system of claim 1, further comprising: a hopper integrated with the ground-working implement frame, wherein the hopper stores dry chemicals; a chamber below the hopper, wherein the dry chemicals and air combine; a distribution conduit that receives the dry chemicals air-blown from the chamber; the inlet coupled to the distribution conduit to receive the dry chemicals.

3. The chemical delivery system of claim 1, wherein the tube is positioned so that all sections of the tube are within a 45 degree angle from vertical.

4. The delivery system of claim 1, wherein dimensions of the tube include the circular cross section having an outer diameter of at least 30 mm, and the oval cross section having a major axis diameter of at least 35 mm and a minor axis diameter of at least 22 mm.

5. The chemical delivery system of claim 1, further comprising: a hopper integrated with the ground-working implement frame, wherein the hopper stores dry chemicals; and wherein the hopper rests on a platform supported by two round wheels.

6. A chemical delivery system comprising: a ground working implement frame coupled to an opener-closer system; the opener-closer system having a cutting-edge that forms part of a disk and creates a furrow in a soil; a tube mounted to the opener-closer system following the cutting-edge of the opener-closer system and arranged rearwardly and proximate a tail member of a boot or scraper pressed against the disk; the tube having an inlet with a circular cross section of a uniform radius; the tube having an outlet with an oval cross section; between the inlet and the outlet, a cross section of the tube transitions from circular to oval, wherein a diameter of the cross section of the outlet is smaller in size than a rear edge width of the tail member; and the tube positioned in the opener-closer system to dispense chemicals into the soil.

7. The chemical delivery system of claim 6, further comprising: a hopper integrated with the ground-working implement frame, wherein the hopper stores dry chemicals; a chamber below the hopper, wherein the dry chemicals and air combine; a distribution conduit that receives the dry chemicals air-blown from the chamber; the inlet coupled to the distribution conduit to receive the dry chemicals.

8. The delivery system of claim 6, wherein dimensions of the tube include the circular cross section having an outer diameter of at least 30 mm, and the oval cross section having a major axis diameter of at least 35 mm and a minor axis diameter of at least 22 mm.

9. The chemical delivery system of claim 6, further comprising: a hopper integrated with the ground-working implement frame, wherein the hopper stores dry chemicals; and wherein the hopper rests on a platform supported by two round wheels.

10. A nutrient applicator comprising: a soil opener tool; a steel tube mounted following the soil opener tool on a side of an implement frame opposite that of an outer closing disk; the steel tube having an inlet end with a circular cross section of a uniform radius and an upper portion arranged to extend beyond a peripheral edge of a hose clamp mounted to the implement frame; the steel tube having an outlet end with an ellipse cross section that is positioned behind a dispensing opening of a liquid chemical tube arranged forward of a tail member of a boot or scraper relative to a direction of travel; between the inlet and the outlet ends, a cross section of the steel tube transitions from circular to elliptical; and the steel tube is positioned about 45 degrees from vertical to dispense dry chemicals into a soil.

11. The nutrient applicator of claim 10, wherein dimensions of the steel tube include the circular cross section having an outer diameter of over 30 mm, and the ellipse cross section having a major axis diameter of over 30 mm and a minor axis diameter of over 20 mm.

12. The nutrient applicator of claim 10, wherein an upper length of the steel tube is over 100 mm before the cross section of the tube swedges from circular to elliptical.

13. The nutrient applicator of claim 10, wherein a total straightened length of the tube is over 600 mm from end to end.

14. The nutrient applicator of claim 10, further comprising an implement frame towing multiple soil opener-closer systems and a hopper, wherein the hopper supplies chemicals to the multiple soil opener-closer systems by an air blowing mechanism; and the soil opener tool is mounted in the multiple soil opener-closer systems.

15. A chemical delivery system comprising: a tube arranged rearwardly and proximate a tail member of a boot or scraper; the tube having an inlet with a circular cross section of a uniform radius; the tube having an outlet with an ellipse cross section that is positioned behind a dispensing opening of a liquid chemical tube arranged forward of the tail member of the boot or scraper relative to a direction of travel, wherein a diameter of the ellipse cross section of the outlet is smaller in size than a rear edge width of the tail member; between the inlet and the outlet, a cross section of the tube swedges or injection-molds from a circle to an ellipse; and the tube being dimensioned to dispense dry chemicals from the outlet into a soil.

16. The chemical delivery system of claim 15, further comprising a soil opener-closer system wherein the tube is positioned to a rear of a soil cutting blade of the soil opener-closer system.

17. The chemical delivery system of claim 16, wherein the tube is positioned so that all sections of the tube are vertically steeper than a 45 degree angle away from a surface of the soil.

18. The chemical delivery system of claim 15, wherein the tube is attached to a rear frame member of a nutrient applicator or a soil tillage vehicle.

19. The chemical delivery system of claim 15, wherein dimensions of the tube include the circular cross section having an outer diameter of about 30-34 mm, and the ellipse cross section having a major axis diameter of about 35-38 mm and a minor axis diameter of about 22-25mm.

20. The chemical delivery system of claim 15, wherein an upper length of the tube is about 148-152 mm before the cross section of the tube swedges.

21. The chemical delivery system of claim 15, wherein a tip to tip length of the tube is about 559-563 mm.

22. The chemical delivery system of claim 15, wherein a composition of the tube includes steel.

23. A nutrient applicator comprising: a soil opener tool; a steel tube mounted following the soil opener tool on a side of an implement frame opposite that of an outer closing disk; the soil opener tool having a cutting-edge that forms part of a disk that is pressed against a boot or scraper; the steel tube having an inlet end with a circular cross section of a uniform radius and an upper portion arranged to extend beyond a peripheral edge of a hose clamp mounted to the implement frame; the steel tube having an outlet end with an ellipse cross section; between the inlet and the outlet ends, a cross section of the steel tube transitions from circular to elliptical; and the steel tube is positioned about 45 degrees from vertical to dispense dry chemicals into a soil.

24. The nutrient applicator of claim 23, wherein dimensions of the steel tube include the circular cross section having an outer diameter of over 30 mm, and the ellipse cross section having a major axis diameter of over 30 mm and a minor axis diameter of over 20 mm.

25. The nutrient applicator of claim 23, wherein an upper length of the steel tube is over 100 mm before the cross section of the tube swedges from circular to elliptical.

26. The nutrient applicator of claim 23, wherein a total straightened length of the tube is over 600 mm from end to end.

27. The nutrient applicator of claim 23, further comprising an implement frame towing multiple soil opener-closer systems and a hopper, wherein the hopper supplies chemicals to the multiple soil opener-closer systems by an air blowing mechanism; and the soil opener tool is mounted in the multiple soil opener-closer systems.

28. A chemical delivery system comprising: a tube arranged rearwardly and proximate a tail member of a boot or scraper pressed against a disk that forms part of a cutting-edge of a soil cutting blade; the tube having an inlet with a circular cross section of a uniform radius; the tube having an outlet with an ellipse cross section, wherein a diameter of the ellipse cross section of the outlet is smaller in size than a rear edge width of the tail member; between the inlet and the outlet, a cross section of the tube swedges or injection-molds from a circle to an ellipse; and the tube being dimensioned to dispense dry chemicals from the outlet into a soil.

29. The chemical delivery system of claim 28, wherein the soil cutting blade is arranged in a soil opener-closer system, and wherein the tube is positioned to a rear of the soil cutting blade of the soil opener-closer system.

30. The chemical delivery system of claim 28, wherein the tube is attached to a rear frame member of a nutrient applicator or a soil tillage vehicle.

31. The chemical delivery system of claim 30, wherein the tube is positioned so that all sections of the tube are vertically steeper than a 45 degree angle away from a surface of the soil.

32. The chemical delivery system of claim 28, wherein dimensions of the tube include the circular cross section having an outer diameter of about 30-34 mm, and the ellipse cross section having a major axis diameter of about 35-38 mm and a minor axis diameter of about 22-25 mm.

33. The chemical delivery system of claim 28, wherein an upper length of the tube is about 148-152 mm before the cross section of the tube swedges.

34. The chemical delivery system of claim 28, wherein a tip to tip length of the tube is about 559-563 mm.

35. The chemical delivery system of claim 28, wherein a composition of the tube includes steel.

* * * * *